United States Patent
Chen et al.

(10) Patent No.: US 8,411,746 B2
(45) Date of Patent: Apr. 2, 2013

(54) MULTIVIEW VIDEO CODING OVER MPEG-2 SYSTEMS

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 12/709,186

(22) Filed: Feb. 19, 2010

(65) Prior Publication Data

US 2010/0316122 A1 Dec. 16, 2010

Related U.S. Application Data

(60) Provisional application No. 61/221,449, filed on Jun. 29, 2009, provisional application No. 61/186,613, filed on Jun. 12, 2009.

(51) Int. Cl.
*H04N 7/12* (2006.01)
(52) U.S. Cl. .................................. 375/240.12
(58) Field of Classification Search .............. 375/240.12
See application file for complete search history.

(56) References Cited

U.S. PATENT DOCUMENTS

| | | | |
|---|---|---|---|
| 5,619,256 A * | 4/1997 | Haskell et al. ............ | 348/43 |
| 2008/0130738 A1 | 6/2008 | Lee et al. | |
| 2008/0137742 A1 | 6/2008 | Chen et al. | |
| 2008/0317124 A1 | 12/2008 | Cho et al. | |
| 2009/0116558 A1* | 5/2009 | Chen et al. ............ | 375/240.16 |
| 2009/0185616 A1 | 7/2009 | Pandit et al. | |
| 2010/0091881 A1 | 4/2010 | Pandit et al. | |
| 2010/0316134 A1 | 12/2010 | Chen et al. | |
| 2012/0155782 A1 | 6/2012 | Choi et al. | |

FOREIGN PATENT DOCUMENTS

| | | |
|---|---|---|
| JP | 2009-004939 A | 1/2009 |
| JP | 2009-004942 A | 1/2009 |
| KR | 102008009220 9 A | 10/2008 |
| WO | WO2006014610 | 2/2006 |
| WO | WO2007081178 | 7/2007 |
| WO | 2007/114610 A1 | 10/2007 |
| WO | 2008005574 A2 | 1/2008 |
| WO | 2008/048499 A2 | 4/2008 |
| WO | WO2008047303 | 4/2008 |
| WO | 2008/088497 A2 | 7/2008 |

OTHER PUBLICATIONS

Anonymous: "Joint Draft 7.0 on Multiview Video Coding" 27. JVT Meeting; Jun. 4, 2008-Oct. 4, 2008; Geneva, ; (Joint Video Team of ISO/IEC JTC1/SC29/WG11 and ITU-T SG.16 ), Jun. 6, 2008, XP030007391 the whole document.

(Continued)

*Primary Examiner* — Richard Torrente
(74) *Attorney, Agent, or Firm* — John Rickenbrode

(57) ABSTRACT

A multiplexer may produce an MPEG-2 (Motion Picture Experts Group) System standard bitstream comprising views with nonconsecutive view order indexes. In one example, an apparatus includes a video encoder that encodes views of a scene, and a multiplexer that constructs a data structure for signaling that a corresponding MPEG-2 (Motion Picture Experts Group) System standard bitstream includes a first view of the views of the scene associated with a first view order index and a second view of the plurality of views of the scene associated with a second view order index. The first view order index and the second view order index are nonconsecutive. The apparatus may further include an output interface that outputs the data structure.

37 Claims, 8 Drawing Sheets

OTHER PUBLICATIONS

Chen, et al., "Comments on FPDAM4 of MEPG-2 Systems: Transport of MVC" 31. JVT Meeting Jul. 3, 2009, Jul. 3, 2010, XP002599509 London Retrieved from the Internet: URL:http://wftp3.itu.int/av-arch/jvt-site/2009_06_London/ [retreived on Sep. 1, 2010].

Grineberg, et al., "Deliverable D3.2 MVC/SVC storage format" Jan. 29, 2009, XP002599508 Retrieved from the Internet: URL:http://www.ist-sea.eu/Public/SEA_D3.2_HHI FF_20090129.pdf [retrieved on Sep. 1, 2010] paragraph [02.3].

International Search Report and Written Opinion PCT/US2010/038389, International Search Authority—European Patent Office—Sep. 20, 2010.

Shierl T., et al., "Information Technology Generic Coding of Moving Pictures and Audio Systems amendment 4: Transport of Multiview Video over ITU-T Rec H.222.0 ISO/IEC 13818-1" Feb. 6, 2009, Feb. 6, 2009, XP002599507 Lausanne, Switzerland Retrieved from the Internet: URL:www.itscj.ipsj.or.jp/sc29/open/29view/29n10151t.doc [retrieved on Sep. 1, 2010].

Vetro et al., Document: JVT-AB204 (rev. 1), "Joint Draft 8.0 on Multiview Video Coding," Joint Video Team (JVT) of ISO/IEC MPEG & ITU-T VCEG(ISO/IEC JTC1/SC29/WG11 and ITU-T SG16 Q.6), 28th Meeting: Hannover, DE, Jul. 20-25, 2008, pp. 1-66, http://wftp3.itu.int/av-arch/jvt-site/2008_07_Hannover/JVT-AB204.zip.

Sullivan of al., Document: JVT-AA007, "Editors' Draft Revision to ITU-T Rec. H.264 | ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.

International Standard ISO/IEC 13818-1:2000(E), "Information Technology—Generic Coding of Moving Pictures and Associated Audio Information: Systems," Second edition, Jan. 12, 2000, pp. 1-174.

Vetro et al., Article titled "Overview of Multiview Video Coding and Anti-Aliasing for 3D Displays," ICIP 2007, pp. I-17 to I-20.

Article titled "Text of ISO/IEC 13818-1:2007/FPDAM 4—Transport of Multiview Video over ITU-T Rec H.222.0 | ISO/IEC 13818-1," International Organization for Standardization Organisation Internationale de Normalisation ISO/IEC JTC1/SC29/WG11 Coding of Moving Pictures and Audio, ISO/IEC JTC1/SC29/WG11 MPEG2009/10436, Lausanne, Switzerland, 2009, pp. 1-21.

* cited by examiner

MULTIVIEW VIDEO CODING OVER MPEG-2 SYSTEMS

RELATED APPLICATIONS

This application claims the benefit of U.S. Provisional Application Nos. 61/221,449, filed Jun. 29, 2009, and 61/186,613, filed Jun. 12, 2009, the entire contents of both of which are hereby expressly incorporated by reference in their respective entireties.

CROSS-REFERENCE TO RELATED APPLICATIONS

The present Application for Patent is related to the following co-pending U.S. patent application: "ASSEMBLING MULTIVIEW VIDEO CODING SUB-BISTREAMS IN MPEG-2 SYSTEMS" by Ying Chen, having Attorney Docket No. 092652, filed concurrently herewith, assigned to the assignee hereof, and expressly incorporated by reference herein.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized by a multiplexer for transmission or storage. MPEG-2 includes a "Systems" section that defines a transport level for many video encoding standards. MPEG-2 transport level systems may be used by MPEG-2 video encoders, or other video encoders conforming to different video encoding standards. For example, MPEG-4 prescribes different encoding and decoding methodologies than those of MPEG-2, but video encoders implementing the techniques of the MPEG-4 standard may still utilize the MPEG-2 transport level methodologies. In general, references to "MPEG-2 systems" refer to the transport level of video data prescribed by MPEG-2. The transport level prescribed by MPEG-2 is also referred to in this disclosure as an "MPEG-2 transport stream" or simply a "transport stream." Likewise, the transport level of MPEG-2 systems also includes program streams. Transport streams and program streams generally include different formats for delivering similar data, where a transport stream comprises one or more "programs" including both audio and video data, while program streams include one program including both audio and video data.

The MPEG-2 Systems specification describes how compressed multimedia (video and audio) data streams may be multiplexed together with other data to form a single data stream suitable for digital transmission or storage. The latest specification of MPEG-2 systems is specified in "Information Technology—Generic Coding of Moving Pictures and Associated Audio: Systems, Recommendation H.222.0; International Organisation for Standardisation, ISO/IEC JTC1/SC29/WG11; Coding of Moving Pictures and Associated Audio," May 2006. MPEG recently designed the transport standard of MVC over MPEG-2 systems and the latest version of this specification is "Study of ISO/IEC 13818-1:2007/FPDAM4 Transport of MVC", MPEG doc. N10572, MPEG of ISO/IEC JTC1/SC29/WG11, Maui, Hi., USA, April 2009.

SUMMARY

In general, this disclosure describes techniques for improving multiview video coding in MPEG-2 (Motion Picture Experts Group) systems. The techniques of this disclosure generally expand the capabilities of the MPEG-2 transport level, e.g., MPEG-2 transport streams and MPEG-2 program streams, with respect to multiview video coding (MVC). For example, the techniques of this disclosure enable transmission of non-consecutive views of an MVC video stream to be transmitted at the transport level. The techniques of this disclosure further enable sub-bitstreams of the transport stream (or program) to each include non-consecutive views. The techniques also enable a receiving device, upon receiving a transport level stream comprising a plurality of sub-bitstreams, each having non-consecutive views, to rearrange the views in the sub-bitstreams such that the transport stream is ordered properly, that is, in increasing order in terms of view order indexes, so that a decoder can properly decode frames of each of the views.

In one example, a method includes constructing, with a source device, a data structure for signaling that a corresponding MPEG-2 (Motion Picture Experts Group) System standard bitstream comprises a first view of a scene associated with a first view order index and a second view of the scene associated with a second view order index, wherein the first view order index and the second view order index are non-consecutive. The method also includes outputting the data structure, e.g., transmitting the data structure to a destination device or storing the data structure to a computer-readable medium.

In another example, an apparatus includes a video encoder that encodes a plurality of views of a scene, a multiplexer that constructs a data structure for signaling that a corresponding MPEG-2 (Motion Picture Experts Group) System standard bitstream comprises a first view of the plurality of views of the scene associated with a first view order index and a second view of the plurality of views of the scene associated with a second view order index, wherein the first view order index and the second view order index are non-consecutive, and an output interface that outputs the data structure.

In another example, an apparatus includes means for constructing, with a source device, a data structure for signaling that a corresponding MPEG-2 (Motion Picture Experts Group) System standard bitstream comprises a first view of a scene associated with a first view order index and a second view of the scene associated with a second view order index, wherein the first view order index and the second view order index are non-consecutive, and means for outputting the data structure.

In another example, a computer-readable storage medium is encoded with instructions that cause a processor to construct a data structure for signaling that a corresponding MPEG-2 (Motion Picture Experts Group) System standard bitstream comprises a first view of a scene associated with a first view order index and a second view of the scene associated with a second view order index, wherein the first view order index and the second view order index are non-consecutive, and output the data structure.

In still another example, a method includes producing, with a client device, a multiview video coding (MVC) standard compliant bitstream from a received bitstream comprising a primary sub-bitstream and an embedded sub-bitstream of the primary sub-bitstream, wherein producing the MVC standard compliant bitstream includes determining whether a view component of the primary sub-bitstream has a view order index that is greater than a view order index of a view component of the embedded sub-bitstream, when the view order index of the view component of the primary sub-bitstream is greater than the view order index of the view component of the embedded sub-bitstream, adding the view component of the embedded sub-bitstream to the produced bitstream, and when the view order index of the view component of the primary sub-bitstream is not greater than the view order index of the view component of the embedded sub-bitstream, adding the view component of the primary sub-bitstream to the produced bitstream. The method further includes outputting the produced bitstream to a video decoder.

In another example, an apparatus includes a receiver that receives a bitstream comprising a primary sub-bitstream and an embedded sub-bitstream of the primary sub-bitstream, a demultiplexer that produces a multiview video coding (MVC) standard compliant bitstream from the received bitstream, wherein to produce the MVC standard compliant bitstream, the demultiplexer determines whether a view component of the primary sub-bitstream has a view order index that is greater than a view order index of a view component of the embedded sub-bitstream, add the view component of the embedded sub-bitstream to the produced bitstream when the view order index of the view component of the primary sub-bitstream is greater than the view order index of the view component of the embedded sub-bitstream, and add the view component of the primary sub-bitstream to the produced bitstream when the view order index of the view component of the primary sub-bitstream is not greater than the view order index of the view component of the embedded sub-bitstream, and a video decoder that decodes the bitstream produced by the demultiplexer.

In another example, an apparatus includes means for producing a multiview video coding (MVC) standard compliant bitstream from a received bitstream comprising a primary sub-bitstream and an embedded sub-bitstream of the primary sub-bitstream, means for determining whether a view component of the primary sub-bitstream has a view order index that is greater than a view order index of a view component of the embedded sub-bitstream, means for adding the view component of the embedded sub-bitstream to the produced bitstream when the view order index of the view component of the primary sub-bitstream is greater than the view order index of the view component of the embedded sub-bitstream, and means for adding the view component of the primary sub-bitstream to the produced bitstream when the view order index of the view component of the primary sub-bitstream is not greater than the view order index of the view component of the embedded sub-bitstream, and means for outputting the produced bitstream to a video decoder.

In another example, a computer-readable storage medium is encoded with instructions for causing a programmable processor to produce, with a client device, a multiview video coding (MVC) standard compliant bitstream from a received bitstream comprising a primary sub-bitstream and an embedded sub-bitstream of the primary sub-bitstream, comprising instructions to determine whether a view component of the primary sub-bitstream has a view order index that is greater than a view order index of a view component of the embedded sub-bitstream, when the view order index of the view component of the primary sub-bitstream is greater than the view order index of the view component of the embedded sub-bitstream, add the view component of the embedded sub-bitstream to the produced bitstream, and when the view order index of the view component of the primary sub-bitstream is not greater than the view order index of the view component of the embedded sub-bitstream, add the view component of the primary sub-bitstream to the produced bitstream, and output the produced bitstream to a video decoder.

The details of one or more examples are set forth in the accompanying drawings and the description below. Other features, objects, and advantages will be apparent from the description and drawings, and from the claims.

DETAILED DESCRIPTION

Figure 1:
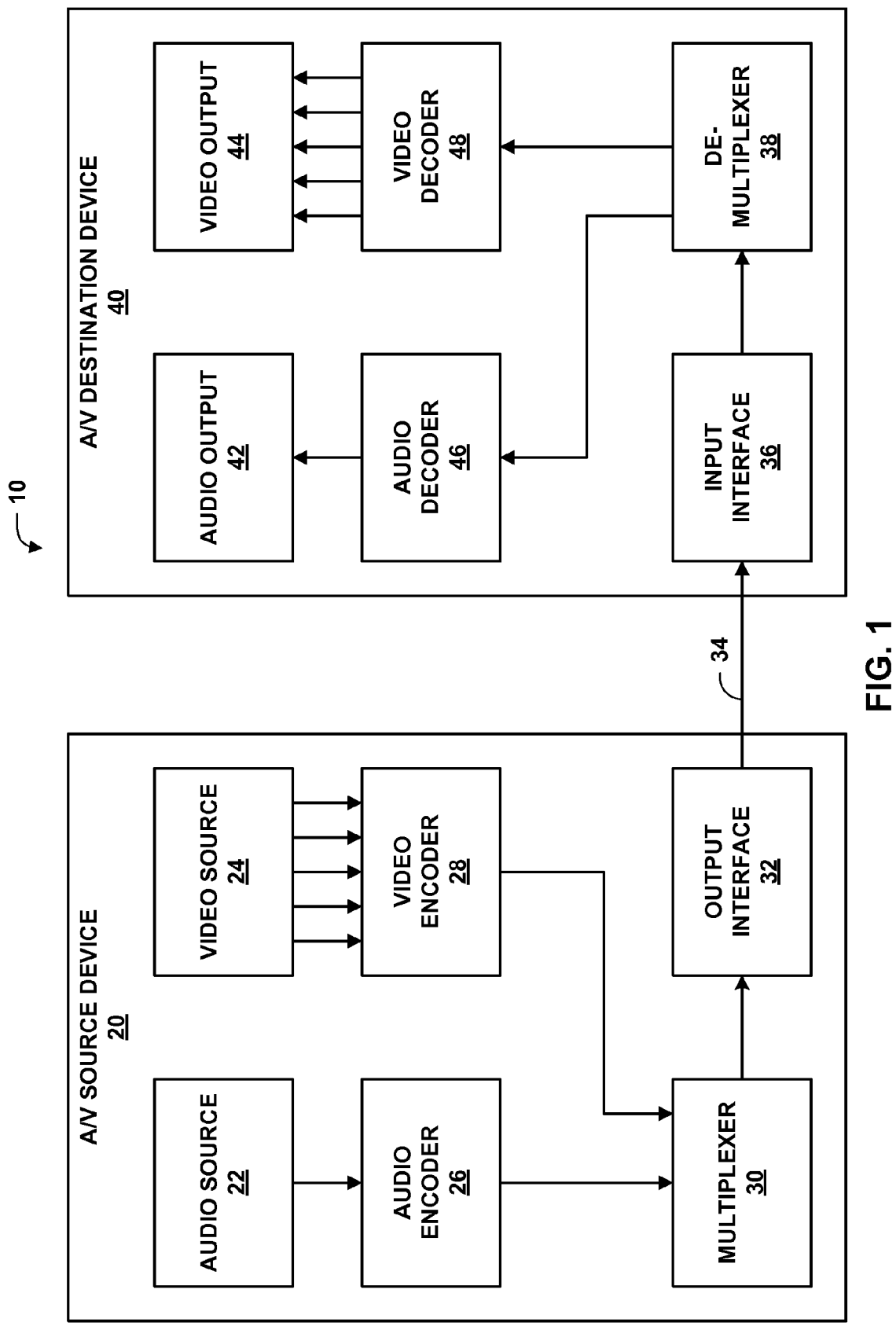
FIG. 1 is a block diagram illustrating an example system in which an audio/video (A/V) source device transports audio and video data to an A/V destination device.

The techniques of this disclosure are generally directed to enhancing Multiview Video Coding (MVC) in MPEG-2 (Motion Picture Experts Group) systems, that is, systems that conform to MPEG-2 with respect to transport level details. MPEG-4, for example, provides standards for video encoding, but generally assumes that video encoders conforming to the MPEG-4 standard will utilize MPEG-2 transport level systems. Accordingly, the techniques of this disclosure are applicable to video encoders that conform to MPEG-2, MPEG-4, ITU-T H.263, ITU-T H.264/MPEG-4, or any other video encoding standard that utilizes MPEG-2 transport streams and/or program streams.

In particular, the techniques of this disclosure may be used to modify syntax elements at the transport level for MPEG-2 transport streams and program streams. For example, the techniques of this disclosure include a descriptor that is transmitted in the transport stream to specifically identify each view of multi-view video data that is sent in the transport stream. A server device, for example, may provide various services, each of which comprises respective subsets of particular views of multiview video coding video data, where the subset of views of the service may be selected based on an application executed by a client device, capacity of decoders executed by the client device, preferences expressed by the client device, or other selection criteria.

In accordance with the techniques of this disclosure, the server device may provide a subset of views having nonconsecutive view order indexes. In one example, the server device specifically signals each of the views that will be included in the transport stream in an MVC extension descriptor that may be included in a program map table (PMT) or a program stream map (PSM).

In some examples, the server device may send a plurality of sub-bitstreams in a single transport stream or program stream. By enabling the views of a bitstream to be nonconsecutive, the techniques of this disclosure also enable the view order indexes corresponding to the views of each sub-bitstream to be nonconsecutive. Although these techniques enable non-consecutive view order indexes in each sub-bitstream, the view order indexes are still required to be increasing in a sub-bitstream, in order to conform to existing bitstream standards, e.g., the MPEG-2 Systems standard. Because views of a first sub-bitstream and a second sub-bitstream may each be non-consecutive, however, the views may arrive at the client device out of order with respect to the view order indexes. The techniques of this disclosure also enable the client device to process such a transport stream to efficiently reorder the views of the first sub-bitstream and the second sub-bitstream such that the view order indexes of the views are increasing. View combinations having non-consecutive view order indexes can be used for view scalability, which can be useful for bandwidth adaptation, decoder efficiency, and provide other such advantages. For example, as opposed to the conventional techniques which would require sending all views to a client device, and that the client device decode each view, having consecutive view order indexes, the techniques of this disclosure enable sending only those views that are specifically required by the client device, even when this results in views having non-consecutive view order indexes. In this manner, a client device may receive only those views that are needed for a particular service, rather than all views with intervening view order indexes.

Although in various sections this disclosure may refer individually to a "transport stream" or a "program stream," it should be understood that the techniques of this disclosure are generally applicable to either or both of MPEG-2 transport streams and program streams. In general, this disclosure describes example descriptors for performing the techniques of this disclosure. Descriptors are used to extend the functionality of a stream. The descriptors of this disclosure may be used both by transport streams and program streams to implement the techniques of this disclosure.

This disclosure also uses the following terms, and proposes inclusion of these terms in a revision of the current MPEG-2 Systems standard, along with the semantics of the terms as indicated:

AVC video sub-bitstream: The base view of MVC bitstream.

AVC video sub-bitstream of MVC: The base view of MVC bitstream discarding the prefix NAL units.

MVC base view sub-bitstream: either AVC video sub-stream or AVC video sub-bitstream of MVC.

MVC view-component subset: the NAL units of one view component.

MVC view_id subset: the NAL units of one view.

MVC video sub-bitstream: the NAL units of the non-base views.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data. Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp. In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and video) data, and reception and subsequent interpretation and decoding of the transported multimedia data. The techniques of this disclosure are particularly applicable to transport of Multiview Video Coding (MVC) data, that is, video data comprising a plurality of views. As shown in the example of FIG. 1, video source 24 may provide a plurality of views of a scene to video encoder 28. MVC may be useful for generating three-dimensional video data to be used by a three-dimensional display, such as a stereoscopic or autostereoscopic three-dimensional display.

A/V source device 20 may provide a "service" to A/V destination device 40. A service generally corresponds to a subset of available views of MVC data. For example, MVC data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data.

A/V source device 20, in accordance with the techniques of this disclosure, is able to provide services that correspond to a subset of views that include nonconsecutive view order indexes. In general, a view is represented by a view identifier, also referred to as a "view_id." View identifiers generally comprise syntax elements that may be used to identify a view. An MVC encoder provides the view_id of a view when the view is encoded. The view_id may be used by an MVC decoder for inter-view prediction or by other units for other purposes, e.g., for rendering.

Figure 6:
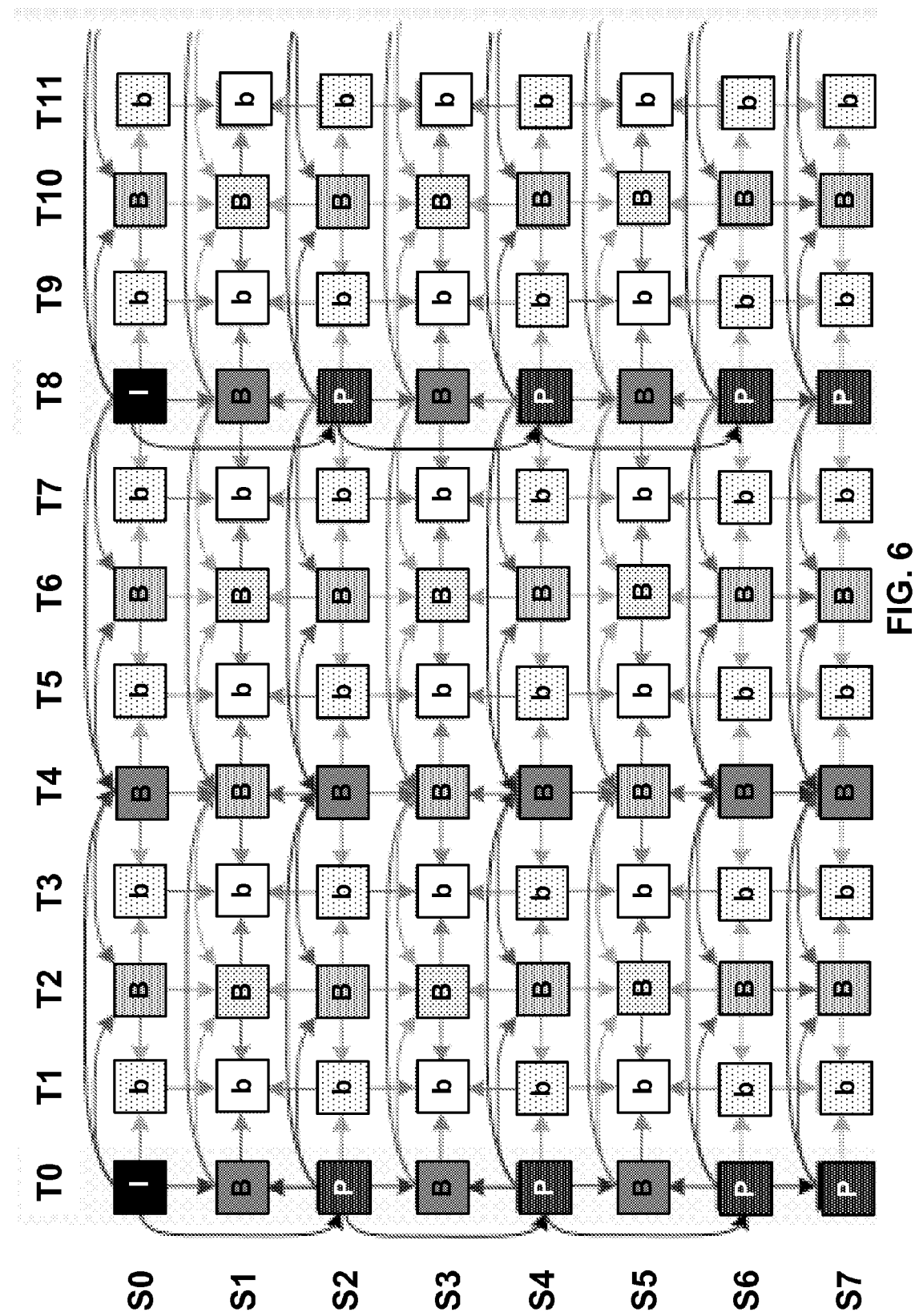
FIG. 6 is a conceptual diagram illustrating an example MVC prediction pattern.

Inter-view prediction is a technique for encoding MVC video data of a frame with reference to one or more frames at a common temporal location as the encoded frame of different views. FIG. 6, which is discussed in greater detail below, provides an example coding scheme for inter-view prediction. In general, an encoded frame of MVC video data may be predictively encoded spatially, temporally, and/or with reference to frames of other views at a common temporal location. Accordingly, reference views, from which other views are predicted, generally are decoded before the views for which the reference views act as reference, so that these decoded views can be used for reference when decoding referential views. The decoding order does not necessarily correspond to the order of the view_ids. Therefore, the decoding order of views is described using view order indexes. View order indexes are indexes that indicate the decoding order of corresponding view components in an access unit.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before multiplexed into a program stream or transport stream. Within the same program, a stream ID is used to distinguish the PES-packets belonging to one elementary stream from the other. The basic unit of data of an elementary stream is a packetized elementary stream (PES) packet. Thus each view of MVC video data corresponds to respective elementary streams. Similarly, audio data corresponds to a respective elementary stream. In the example of FIG. 1, multiplexer 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, multiplexer 30 may include packetizers for forming PES packets from encoded audio and video data.

A "program," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Multiplexer 30 is responsible for assembling elementary streams into constituent program streams or transport streams. A program stream and a transport stream are two alternative multiplexes targeting different applications.

In general, a program stream consists of data for one program, while a transport stream may comprise data for one or more programs. Multiplexer 30 may encode either or both of a program stream or a transport stream, based on a service being provided, a medium into which the stream will be passed, a number of programs to be sent, or other considerations. For example, when the video data is to be encoded in a storage medium, multiplexer 30 may be more likely to form a program stream, whereas when the video data is to be streamed over a network, broadcast, or sent as part of video telephony, multiplexer 30 may be more likely to use a transport stream.

Multiplexer 30 may be biased in favor of using a program stream for the storage and display of a single program from a digital storage service. A program stream is intended for use in error-free environments or environments less susceptible to encountering errors, because program streams are rather susceptible to errors. A program stream simply comprises the elementary streams belonging to it and usually contains packets with variable length packets. In a program stream, PES-packets that are derived from the contributing elementary streams are organized into "packs." A pack comprises a pack-header, an optional system-header, and any number of PES-packets taken from any of the contributing elementary streams, in any order. The system header contains a summary of the characteristics of the program stream such as its maximum data rate, the number of contributing video and audio elementary streams, further timing information, or other information. A decoder may use the information contained in a system header to determine whether the decoder is capable of decoding the program stream or not.

Multiplexer 30 may use a transport stream for the simultaneous delivery of a plurality of programs over potentially error-prone channels. A transport stream is a multiplex devised for multi-program applications such as broadcasting, so that a single transport stream can accommodate many independent programs. A transport stream comprises a succession of transport packets, each of the transport packets being 188-bytes long. The use of short, fixed length packets means that the transport stream is less susceptible to errors than the program stream. Further, each 188-byte-long transport packet may be given additional error protection by processing the packet through a standard error protection process, such as Reed-Solomon encoding. The improved error resilience of the transport stream means that it has a better chance of surviving the error-prone channels to be found in a broadcast environment, for example.

It might seem that the transport stream is clearly the better of the two multiplexes with its increased error resilience and ability to carry many simultaneous programs. However, the transport stream is a more sophisticated multiplex than the program stream and is consequently more difficult to create and to demultiplex. The first byte of a transport packet is a synchronization byte having a value of 0x47 (hexadecimal 47, binary '01000111,' decimal 71). A single transport stream may carry many different programs, each program comprising many packetized elementary streams. Multiplexer 30 may use a thirteen-bit Packet Identifier (PID) field to distinguish transport packets containing the data of one elementary stream from those carrying the data of other elementary streams. It is the responsibility of the multiplexer to ensure that each elementary stream is awarded a unique PID value. The last byte of a transport packet is the continuity count field. Multiplexer 30 increments the value of the continuity count field between successive transport packets belonging to the same elementary stream. This enables a decoder or other unit of a destination device, such as A/V destination device 40, to detect the loss or gain of a transport packet and hopefully conceal the errors that might otherwise result from such an event.

Multiplexer 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units contain the core compression engine and may comprise block, macroblock, and/or slice levels. Other NAL units are non-VCL NAL units.

Multiplexer 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of an NAL header may be used for a simple one-path bitstream adaptation process. The temporal_id element may be used for specifying the temporal level of the corresponding NAL unit, where different temporal levels correspond to different frame rates. The anchor_pic_flag element may indicate whether a picture is an anchor picture or non-anchor picture.

Anchor pictures and all the pictures succeeding it in the output order (that is, the display order) can be correctly decoded without decoding of previous pictures in the decoding order (that is, the bitstream order), and thus can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order of display order.

The view_id element comprises syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit.

A NAL unit including video data in its payload may comprise various granularity levels of video data. For example, a NAL unit may comprise a block of video data, a macroblock, a plurality of macroblocks, a slice of video data, or an entire frame of video data. Multiplexer 30 may receive encoded video data from video encoder 28 in the form of PES packets of elementary streams. Multiplexer 30 may associate each elementary stream with a corresponding program by mapping stream_ids to corresponding programs, e.g., in a database or other data structure, such as a Program Map Table (PMT) or Program Stream Map (PSM).

Multiplexer 30 may also assemble access units from a plurality of NAL units. In general, an access unit may comprise one or more NAL units for representing a frame of video data, as well audio data corresponding to the frame when such audio data is available. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component comprises an encoded picture (or frame) for a particular view at a particular time. Accordingly, an access unit may be defined as comprising all view components of a common temporal instance.

Multiplexer 30 may also embed data regarding a program in a NAL unit. For example, multiplexer 30 may create a NAL unit comprising a Program Map Table (PMT) or a Program Stream Map (PSM). In general, a PMT is used to describe a transport stream, while a PSM is used to describe a program stream. As described in greater detail with respect to the example of FIG. 2 below, multiplexer 30 may comprise or interact with a data storage unit that associates elementary streams received from audio encoder 26 and video encoder 28 with programs and accordingly with respective transport streams and/or program streams.

The MPEG-2 Systems standard allows for extensions of the system by way of "descriptors." Both PMTs and PSMs include descriptor loops in which one or more descriptors may be inserted. In general, a descriptor comprises a structure that may be used to extend the definition of programs and/or program elements. This disclosure describes two descriptors for performing the techniques of this disclosure: an MVC extension descriptor and a hierarchy descriptor. In general, the MVC extension descriptor of this disclosure enhances the conventional MVC extension descriptor by particularly identifying view order indexes of views that are embedded in a program stream or transport stream, while the hierarchy descriptor of this disclosure includes a flag that indicates whether an associated program element increases the number of the views of the bitstream resulting from the program element that is referenced by an element of the hierarchy descriptor.

Video compression standards such as ITU-T H.261, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "x" and "by" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, multiplexer 30, and demultiplexer 38 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined audio encoder/decoder (CODEC). An apparatus including video encoder 28, video decoder 48, audio encoder audio encoder 26, audio decoder 46, multiplexer 30, and/or demultiplexer 38 may comprise an integrated circuit, a microprocessor, and/or a wireless communication device, such as a cellular telephone.

The techniques of this disclosure may offer certain advantages over the conventional techniques for MVC sub-bit-streams, which disable the support of signaling characteristics for some operation points. Unlike the conventional techniques, the syntax elements and the semantics of the MVC extension descriptor of this disclosure enable non-consecutive view order index values, thus making it possible to support a bitstream or a sub-bitstream conforming to MVC and with view order index values that are non-consecutive. This disclosure also proposes a hierarchy descriptor for signaling view enhancement, which enables a decoder to determine that an MVC sub-bitstream relies on other views for successful decoding.

To provide better support of characteristics signaling, the view order index values, as signaled in the proposed MVC extension descriptor, may optionally be non-consecutive. Moreover, the view order index values or the view_id values may be signaled in the MVC extension descriptor.

As an alternative, a view order index remapping mechanism may be used in which maps the view order index values of the views of a conforming MVC sub-bitstream, into consecutive view order index values, by modifying the view order defined in the active, conventional sequence parameter set (SPS) MVC extension, before this MVC sub-bitstream is multiplexed. In such a mechanism, the conventional MVC extension descriptor is used to signal view IDs, rather than view order indexes, and thus an encoder may be reconfigured to encode the views as having different view IDs, while the decoder can be reconfigured to interpret the conventional MVC extension descriptor differently, according to the reconfigured encoding order. For example, suppose there are three views with view_ids 0, 1, and 2 having view order indices 0, 1, and 2, respectively. Assume further that a service required only view 0 and view 2. The encoder can encode the views in an order corresponding to view IDs 0, 2, 1, such that the conventional SPS MVC extension descriptor can be used to signal the view_id values with an order of 0, 2, 1. In this way, view 2 can have view order index as 1, so that the combination of view 0 and view 2 has consecutive view order indices.

Additionally, to avoid duplications of the prefix NAL unit when the AVC video sub-bitstream of MVC is present, this disclosure proposes that a prefix MVC sub-bitstream should be defined, and that in some examples, such a prefix MVC sub-bitstream is included when there is at least one MVC sub-bitstream. Moreover, this disclosure proposes that the MVC specific SEI messages, that is, the SEI messages that are defined in Annex H of the AVC specification, belonging to the base view or the MVC SEI messages applying to all the views of the MVC bitstream can be associated within this "prefix MVC sub-bitstream" to enable efficient storage and transport, in terms of storage size or bandwidth optimization. This disclosure also proposes that the same idea can be applied to the transport of scalable video over MPEG-2 Systems, also referred to as Amendment 3 of Information technology— Generic coding of moving pictures and associated audio information: Systems (referred to in this disclosure as "MPEG-2 Systems" or "MPEG-2 Systems standard").

After multiplexer 30 has assembled a NAL unit and/or an access unit from received data, multiplexer 30 passes the unit to output interface 32 for output. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the NAL unit or access unit to a computer-readable medium 34, such as, for example, a transmission signal, a magnetic medium, an optical medium, a memory, a flash drive, or other computer-readable medium.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to demultiplexer 38. Demultiplexer 38 may demultiplex a transport stream or program stream into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44. Video output 44 may comprise a display that uses a plurality of views of a scene, e.g., a stereoscopic or autostereoscopic display that presents each view of a scene simultaneously.

In addition, demultiplexer 38 may reorder views of one or more sub-bitstreams such that the view order indexes of the stream have a strictly increasing order, e.g., when at least one view of an embedded sub-bitstream has a view with a view order index that is less than a view order index of a view of a primary sub-bitstream in which the embedded sub-bitstream is embedded. In this manner, A/V destination device 40 may correspond to an apparatus comprising a demultiplexer that produces an MVC standard compliant bitstream from a received bitstream.

Figure 2:
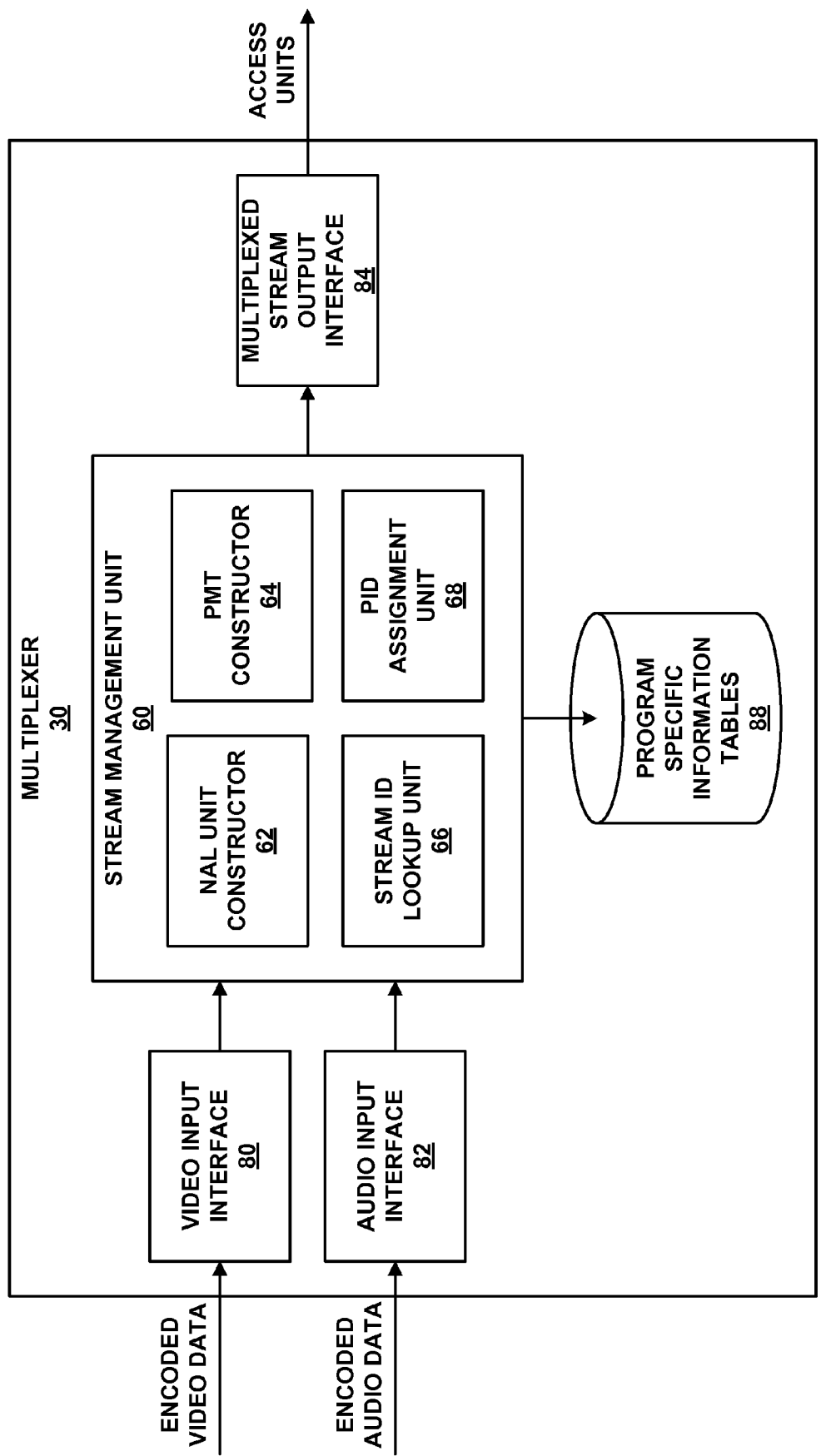
FIG. 2 is a block diagram illustrating an example arrangement of components of a multiplexer.

FIG. 2 is a block diagram illustrating an example arrangement of components of multiplexer 30 (FIG. 1). In the example of FIG. 2, multiplexer 30 includes stream management unit 60, video input interface 80, audio input interface 82, multiplexed stream output interface 84, and program specific information tables 88. Stream management unit 60 includes NAL unit constructor 62, PMT constructor 64, stream identifier (stream ID) lookup unit 66, and program identifier (PID) assignment unit 68.

In the example of FIG. 2, video input interface 80 and audio input interface 82 include respective packetizers for forming PES units from encoded video data and encoded audio data. In other examples, video and/or audio packetizers may be present external to multiplexer 30. With respect to the example of FIG. 2, video input interface 80 may form PES packets from encoded video data received from video encoder 28 and audio input interface 82 may form PES packets from encoded audio data received from audio encoder 26.

Stream management unit 60 receives PES packets from video input interface 80 and audio input interface 82. Each PES packet includes a stream ID identifying the elementary stream to which the PES packet belongs. Stream ID lookup unit 66 may determine a program to which the PES packet corresponds by querying program specific information tables 88. That is, stream ID lookup unit 66 may determine to which program a received PES packet corresponds. Each program may comprise a plurality of elementary streams, while in general, one elementary stream corresponds to only one program. However, in some examples, an elementary stream may be included in a plurality of programs. Each PES packet may be included in a plurality of streams output from multiplexer 30, as various services may each include various subsets of available audio and video streams. Accordingly, stream ID lookup unit 66 may determine whether a PES packet should be included in one or more output streams (e.g., one or more transport or program streams), and particularly in which of the output streams to include the PES packet.

In one example, each elementary stream corresponds to a program. Multiplexer 30 may be responsible for ensuring that each elementary stream is associated with a particular program, and accordingly, a program ID (PID). When a PES packet is received including a stream ID that is not recognized by multiplexer 30 (e.g., a stream ID not stored in program specific information tables 88), PID assignment unit 68 creates one or more new entries in program specific information tables 88 to associate the new stream ID with an unused PID.

After determining a program to which a PES packet corresponds, NAL unit constructor 62 forms a NAL unit comprising the PES packet, e.g., by encapsulating the PES packet with a NAL unit header, including the PID of the program to which the stream ID of the PES packet corresponds. In some examples, NAL unit constructor 62, or another sub-unit of stream management unit 60, may form an access unit comprising a plurality of NAL units.

PMT constructor 64 creates Program Map Tables (PMTs) for a corresponding output stream of multiplexer 30 using information from program specific information tables 88. In another example, stream management unit 60 may comprise a PSM constructor for creating program stream maps for a program stream output by multiplexer 30. In some examples, multiplexer 30 may comprise both PMT constructor 64 and a PSM constructor and output either or both of a transport stream and a program stream. In the example of FIG. 2, PMT constructor 64 may construct a PMT including the descriptors prescribed by this disclosure, e.g., an MVC enhancement descriptor and a hierarchy descriptor, as well as any other necessary descriptors and PMT data for the PMT. PMT constructor 64 may periodically, e.g., after a certain period of time or after a certain amount of data has been transmitted, send a subsequent PMT for the transport stream. PMT constructor 64 may pass created PMTs to NAL unit constructor 62 for forming a NAL unit comprising the PMT, e.g., by encapsulating the PMT with a corresponding NAL unit header, including the corresponding PID.

Multiplexed stream output interface 84 may receive one or more NAL units and/or access units from stream management unit 60, e.g., NAL units comprising PES packets (e.g., audio or video data) and/or NAL units comprising a PMT. In some examples, multiplexed stream output interface 84 may form access units from one or more NAL units corresponding to a common temporal location after the NAL units are received from stream management unit 60. Multiplexed stream output interface 84 transmits the NAL units or access units as output in a corresponding transport stream or program stream.

Figure 3:
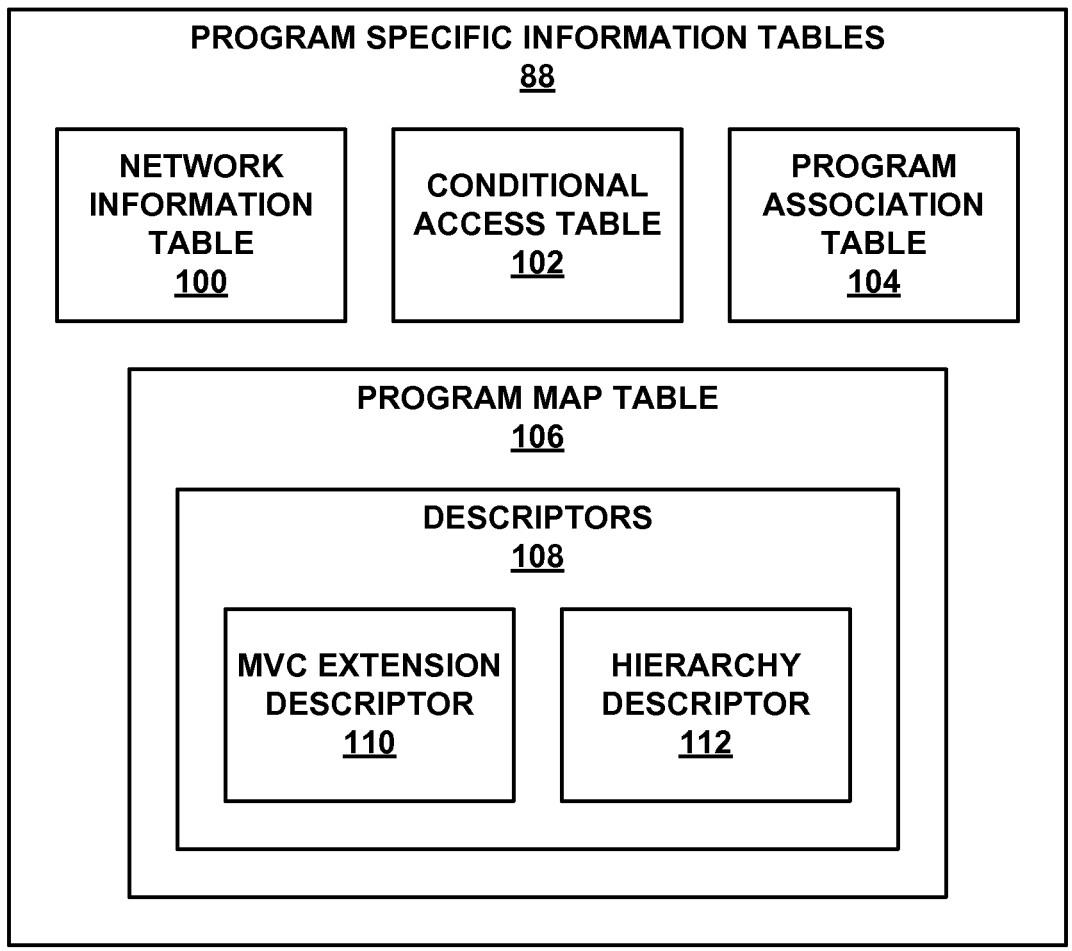
FIG. 3 is a block diagram illustrating an example set of program specific information tables.

FIG. 3 is a block diagram illustrating an example set of program specific information tables 88. The elementary stream to which a transport packet belongs can be determined based on the PID value of the transport packet. In order for a decoder to properly decode received data, the decoder needs to be able to determine which elementary streams belong to each program. Program specific information, as included in program specific information table 88, may explicitly specify relationships between the programs and component elementary streams. In the example of FIG. 3, program specific information tables 88 include network information table 100, conditional access table 102, program access table 104, and program map table 106. For the example of FIG. 3, it is assumed that the output stream comprises an MPEG-2 transport stream. In an alternative example, the output stream may comprise a program stream, in which case program map table 106 may be substituted with a program stream map.

The MPEG-2 Systems specification specifies that every program carried in a transport stream has a program map table, such as program map table 106, associated with it. Program map table 106 may include details about the program and the elementary streams that the program includes.

As one example, program, identified as program number 3, may contain a video elementary stream with PID 33, an English audio stream with PID 57, and a Chinese audio stream with PID 60. It is permitted for a PMT to include more than one program.

The basic program map table specified by MPEG-2 systems specification may be embellished with some of the many descriptors, e.g., descriptors 108, specified within the MPEG-2 systems specification. Descriptors 108 may include any or all of the specified descriptors of the MPEG-2 systems specification. In general, descriptors, such as descriptors 108, convey further information about a program or its component elementary streams. The descriptors may include video encoding parameters, audio encoding parameters, language identification, pan-and-scan information, conditional access details, copyright information, or other such information. A broadcaster or other user may define additional private descriptors.

This disclosure uses two descriptors in order to allow non-consecutive view order indexes to be carried in an output stream, such as a transport stream or a program stream. As show in FIG. 2, the two descriptors of this disclosure include MVC extension descriptor 110 and hierarchy descriptor 112. In the video related component elementary streams, there is also a hierarchy descriptor, which provides information to identify the program elements containing components of hierarchically-coded video, audio, and private streams.

In an example in which the output of multiplexer 30 comprises a program stream, program specific information tables 88 may include a program stream map (PSM). A PSM may provide a description of the elementary streams in the corresponding program stream and the relationships of the elementary streams to one another. In some examples, a program stream map may also correspond to a transport stream. When carried in a corresponding transport Stream, the PSM structure should not be modified. Multiplexer 30 may indicate that a PSM is present in a PES packet by setting the stream_id value of the PES packet to 0xBC, that is, the hexadecimal value BC, which corresponds to the binary value 10111100, or the decimal value 188.

Multiplexer 30 maintains a complete list of all programs available in a transport stream in program association table 104. Multiplexer 30 also may embed program association tables in NAL units. Multiplexer 30 may indicate that a NAL unit includes a program association table by assigning the NAL unit a PID value of 0. Multiplexer 30 may list each program, along with the PID value of the transport packets that contain the corresponding program map table, in program association table 104. Using the same example mentioned above, the example program map table that specifies the elementary streams of program number 3 has a PID of 1001 and another PMT has another PID of 1002. This set of information may be included in program association table 104.

Network information table (NIT) and Conditional access table (CAT): The program number zero, specified in PAT, has special meaning. In particular, the program number zero is used to point the way to the Network Information Table. The table is optional and when present, it is intended to provide information about the physical network carrying the transport stream such as channel frequencies, satellite transponder details, modulation characteristics, service originator, service name and details of alternative networks available.

If any elementary streams within a transport stream are scrambled, then a Conditional Access Table must be present. The table provides details of the scrambling system(s) in use and provides the PID values of transport packets that contain the conditional access management and entitlement information. The format of this information is not specified within the MPEG-2.

Figure 4:
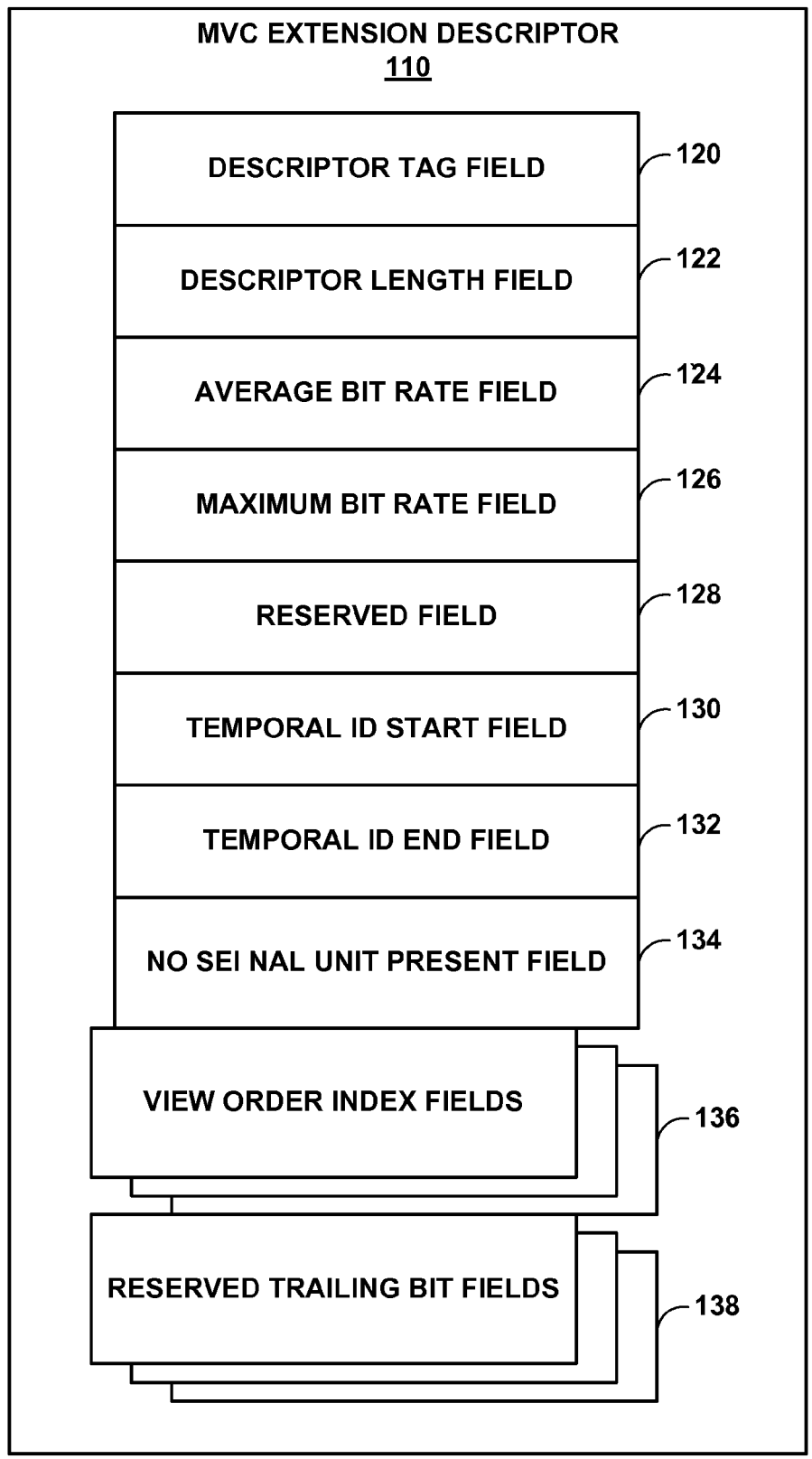
FIG. 4 is a block diagram illustrating an example set of data that may be included in a multiview video coding (MVC) extension descriptor.

FIG. 4 is a block diagram illustrating an example set of data that may be included in MVC extension descriptor 110. In the example of FIG. 4, MVC extension descriptor 110 includes descriptor tag field 120, descriptor length field 122, average bit rate field 124, maximum bit rate field 126, reserved field 128, temporal identifier (ID) start field 130, temporal ID end field 132, no supplemental enhancement information (SEI) NAL unit present field 134, one or more view order index fields 136, and one or more reserved trailing bit fields 138. MVC extension descriptor 110 also specifies an operation point, which corresponds to an MVC sub-bitstream. The bit depths of the fields of MVC extension descriptor 110 below correspond to one example for an MVC extension descriptor. Other examples may include other bit depths, values, or ranges to individually signal each view order index of each view included in the corresponding bitstream or sub-bitstream.

Descriptor tag field 120 corresponds to an eight-bit descriptor tag field that is included in every descriptor, as set forth by the MPEG-2 Systems standard, to particularly identify the descriptor. The MPEG-2 Systems standard defines certain descriptor tags and marks other descriptor tag values, e.g., values 36 to 63, as "reserved." The techniques of this disclosure propose setting the value of descriptor tag field 120 for MVC extension descriptor 110 to "49," which corresponds to one of the reserved descriptor tags as specified in the MPEG-2 Systems specification.

Descriptor length field 122 corresponds to an eight-bit descriptor length field that is also included in every descriptor, as set forth by the MPEG-2 Systems standard. Multiplexer 30 may set the value of descriptor length field 122 equal to the number of bytes of MVC extension descriptor 110 immediately following descriptor length field 122. Because MVC extension descriptor 110 may comprise a variable length, e.g., based on a number of view order indexes 136 included in the particular instance of MVC extension descriptor 110, multiplexer 30 calculates the size of the instance of MVC extension descriptor 110 and sets the value of descriptor length field 122 of the instance of the descriptor accordingly.

Average bit rate field 124 comprises a sixteen-bit field that indicates the average bit rate, in kilobits per second, of a re-assembled AVC video stream. That is, average bit rate field 124 describes the average bit rate for a video stream when the video stream is assembled from constituent parts of the transport stream or program stream to which MVC extension descriptor 110 corresponds. In some examples, multiplexer 30 may set the value of average bit rate field 124 to zero to indicate that the average bit rate is not indicated by MVC extension descriptor 110.

Maximum bit rate field 126 comprises a sixteen-bit field that indicates the maximum bit rate, in kilobits per second, of the re-assembled AVC video stream. That is, maximum bit rate field 126 describes the maximum bit rate for a video stream when the video stream is assembled from constituent parts of the transport stream or program stream to which MVC extension descriptor 110 corresponds. In some examples, multiplexer 30 may set the value of maximum bit rate field 126 to zero to indicate that the maximum bit rate is not indicated by MVC extension descriptor 110.

Temporal ID start field 130 comprises a three-bit field that indicates the minimum value of the temporal_id of the NAL unit header syntax element of all the NAL units contained in the associated MVC video sub-bitstream. That is, a temporal ID value is included in a header for each NAL unit. In general, the temporal ID value corresponds to a particular framerate, where relatively larger temporal ID values correspond to higher framerates. For example, a value of '0' for a temporal ID may correspond to a framerate of 15 frames per second (fps), a value of '1' for a temporal ID may correspond to a framerate of 30 fps. In this manner, gathering all pictures having a temporal ID of 0, in this example, into a set may be used to form a video segment having a framerate of 15 fps, whereas gathering all pictures having a temporal ID of 0 and a all pictures having a temporal ID of 1 into a different set may be used to form a different video segment having a framerate of 30 fps. Multiplexer 30 determines the smallest temporal ID of all of the NAL units of the MVC video sub-bitstream and sets the value of temporal ID start field 130 equal to this determined smallest temporal ID value.

Temporal ID end field 132 comprises a three-bit field that indicates the maximum value of the temporal ID of the NAL unit header syntax element of all the NAL units contained in the associated MVC video sub-bitstream. Accordingly, multiplexer 30 determines the largest temporal ID of all of the NAL units of the MVC video sub-bitstream and sets the value of temporal ID start field 130 equal to this determined largest temporal ID value.

No SEI NAL unit present field 134 comprises a one-bit flag that, when set to '1,' indicates that no supplemental enhancement information NAL units are present in the associated video sub-bitstream. Multiplexer 30 may determine whether one or more supplemental enhancement information NAL units have been placed in the bitstream and set the value of no SEI NAL unit present field 134 to a value of '1' when there are no SEI NAL units in the bitstream, but may set the value of no SEI NAL unit present field 134 to a value of '0' when at least one SEI NAL unit is present in the bitstream.

In one aspect, the techniques of this disclosure describe the modification of conventional MVC extension descriptors to include one or more view order index fields 136, represented using a loop as shown in Table 1 below. Each one of view order index fields 136 comprises a 10-bit field that indicates the value of the view order index of a corresponding one of the NAL units contained in the associated MVC video sub-bitstream. Multiplexer 30 may set the values of view order index fields 136 according to the view order indexes of the views included in the MVC video sub-bitstream. Moreover, the values of view order index fields 136 may be signaled in ascending order. In this manner, MVC extension descriptor 110 may describe non-consecutive view order indexes of views included in the MVC video sub-bitstream.

In the example of FIG. 4, MVC extension descriptor 110 also comprises reserved trailing bit fields 138. This disclosure describes reserving these bits for a future purpose without specifying how these values are necessarily to be used. In various examples, the reserved trailing bits may be represented as one single, continuous reserved segment of bits of MVC extension descriptor 110, or as a loop over a plurality of individual bits.

Table 1 below describes the syntax elements of MVC extension descriptor 110 of this disclosure. Table 1 also describes, for each syntax element, a number of bits used to represent the syntax element and a mnemonic describing a type for the syntax element. The number of bits corresponds to the number of bits that are allocated to the corresponding syntax element when MVC extension descriptor 110 is transmitted in a coded bitstream. Mnemonics are used in the MPEG-2 Systems standard to describe different data types that are used in the coded bitstream. The mnemonics used in this disclosure include "uimsbf," which the MPEG-2 Systems standard defines as an unsigned integer having the most significant bit first, and "bslbf," which the MPEG-2 Systems standard defines as a bit string with left bit first, where "left" is the order in which bit strings are written in the MPEG-2 Systems standard. Each of the syntax elements in the example of Table 1 corresponds to a respective one of the syntax elements described above with respect to MVC extension descriptor 110. In particular, this disclosure provides the "for" loop in Table 1 to particularly signal view order indexes for each view of a program stream or a transport stream. In this manner, the "for" loop in the MVC extension descriptor of Table 1 may be used to signal that a corresponding MPEG-2 System standard bitstream comprises a first view of a scene associated with a first view order index and a second view of the scene associated with a second view order index, wherein the first view order index and the second view order index are non-consecutive.

TABLE 1

MVC extension descriptor

| Syntax | No. of bits | Mnemonic |
|---|---|---|
| MVC_extension_descriptor( ) { | | |
|   descriptor_tag | 8 | uimsbf |
|   descriptor_length | 8 | uimsbf |
|   average_bit_rate | 16 | uimsbf |
|   maximum_bitrate | 16 | uimsbf |
|   reserved | 4 | bslbf |
|   temporal_id_start | 3 | bslbf |
|   temporal_id_end | 3 | bslbf |
|   no_sei_nal_unit_present | 1 | bslbf |
|   for ( i = 0 ; i< N; i++) { | | |
|     view_order_index | 10 | bslbf |
|   } | | |
|   reserved_trailing_bits | | |
| } | | |

In another example, the reserved trailing bits may instead be individually signaled. Table 2 below illustrates an example MVC extension descriptor that signals each of the reserved trailing bits individually.

TABLE 2

MVC extension descriptor with individually signaled trailing bits

| Syntax | No. of bits | Mnemonic |
|---|---|---|
| MVC_extension_descriptor( ) { | | |
|   descriptor_tag | 8 | uimsbf |
|   descriptor_length | 8 | uimsbf |
|   average_bit_rate | 16 | uimsbf |
|   maximum_bitrate | 16 | uimsbf |
|   reserved | 4 | bslbf |
|   temporal_id_start | 3 | bslbf |
|   temporal_id_end | 3 | bslbf |
|   no_sei_nal_unit_present | 1 | bslbf |
|   for ( i = 0 ; i< N; i++) { | | |
|     view_order_index | 10 | bslbf |
|   } | | |
|   for ( i = 0 ; i< N1; i++) { | | |
|     reserved_trailing_bit | 1 | bslbf |
|   } | | |
| } | | |

Figure 5:
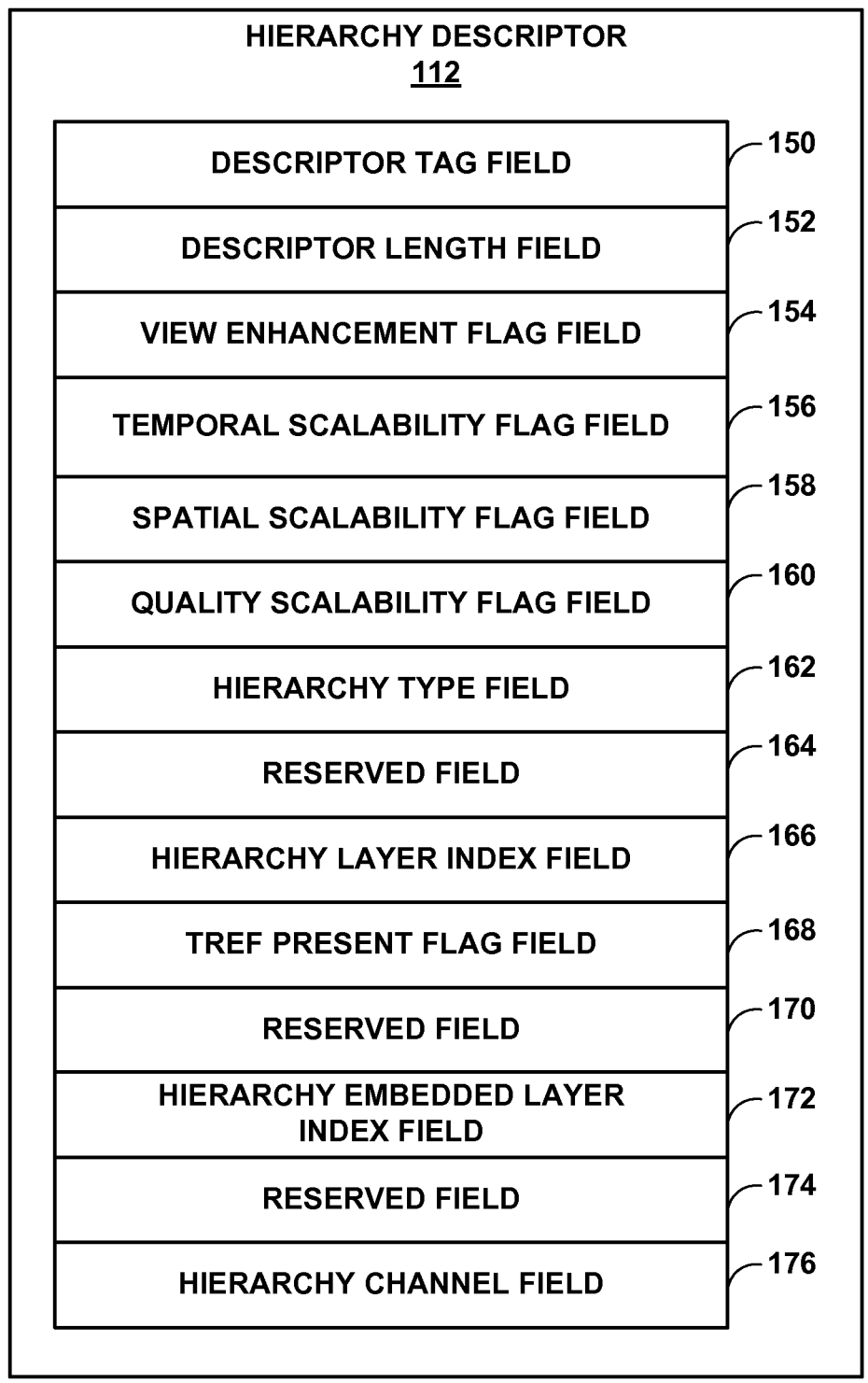
FIG. 5 is a block diagram illustrating an example set of data that may be included in a hierarchy descriptor.

FIG. 5 is a block diagram illustrating an example set of data that may be included in hierarchy descriptor 112. In the example of FIG. 5, hierarchy descriptor 112 includes descriptor tag field 150, descriptor length field 152, view enhancement flag field 154, temporal scalability flag field 156, spatial scalability flag field 158, quality scalability flag field 160, hierarchy type field 162, reserved field 164, hierarchy layer index field 166, TREF present flag field 168, reserved field 170, hierarchy embedded layer index field 172, reserved field 174, and hierarchy channel field 176. To improve signaling, the view scalability and/or view dependency relationship, the techniques of this disclosure may provide that one flag is signaled in the hierarchy descriptor, which indicates whether the associated program element increases the number of the views of the bitstream resulting from the program element referenced by the hierarchy_embedded_layer_index.

As noted above, the MPEG-2 Systems specification specifies that each descriptor includes a descriptor tag field and a descriptor length field. Accordingly, hierarchy descriptor 112 includes descriptor tag field 150 and descriptor length field 152. In accordance with the MPEG-2 Systems specification, multiplexer 30 may set the value of descriptor tag field 150 to a value of "4" for hierarchy descriptor 112.

The length of hierarchy descriptor 112 can be determined a priori, because each instance of hierarchy descriptor 112 should include the same amount of data. In one example, with respect to Table 3 below, multiplexer 30 may set the value of descriptor length field 152 to a value of 32, indicative of the number of bits in an instance of hierarchy descriptor 112 following the end of descriptor length field 152.

The techniques of this disclosure propose adding view enhancement flag field 154 to the conventional hierarchy descriptor. In accordance with the techniques of this disclosure, view enhancement flag field 154 may comprise a one-bit flag, which when set to '0' indicates that the associated program element enhances the number of views of the bit-stream resulting from the program element referenced by a hierarchy embedded layer index. The techniques of this disclosure also propose reserving the value of '1' for view enhancement flag field 154.

Hierarchy type field 162 describes the hierarchical relation between the associated hierarchy layer and its hierarchy embedded layer. In one example, multiplexer 30 sets the value of hierarchy type field 162 based on the hierarchical relationship, e.g., as described by Table 4 below. As one example, when scalability applies in more than one dimension, multiplexer 30 may set hierarchy type field 162 to a value of "8" ("Combined Scalability" as shown in Table 4), and multiplexer 30 sets values of temporal scalability flag field 156, spatial scalability flag field 158, and quality scalability flag field 160 according to data retrieved from PES packets and PES packet headers of the respective streams. In general, multiplexer 30 may determine dependencies between the different streams corresponding to various views and/or audio data streams. Multiplexer 30 may also determine whether a dependent stream that comprises an enhancement layer is a spatial layer, a signal-to-noise (SNR) enhancement layer, a quality enhancement layer, or another type of enhancement layer.

As another example, for MVC video sub-bitstreams, multiplexer 30 may set hierarchy type field 162 to a value of '9' ("MVC" as shown in Table 4) and may set the values of each of scalability flag field 156, spatial scalability flag field 158, and quality scalability flag field 160 to '1'. As yet another example, for MVC base view sub-bitstreams, multiplexer 30 may set the value of hierarchy type field 162 to a value of '15' and may set values of scalability flag field 156, spatial scalability flag field 158, and quality scalability flag field 160 to '1'. As still another example, for Prefix MVC sub-bitstream, multiplexer 30 may set hierarchy type field 162 to a value of '14' and may set scalability flag field 156, spatial scalability flag field 158, and quality scalability flag field 160 to '1.'

Hierarchy layer index field 166 may comprise a six-bit field that defines a unique index of the associated program element in a table of coding layer hierarchies. Indices may be unique within a single program definition. For video sub-bitstreams of AVC, video streams conforming to one or more profiles defined in Annex G of ITU-T Rec. H.264|ISO/IEC 14496-10, this is the program element index, which is assigned in a way that the bitstream order will be correct if associated SVC dependency representations of the video sub-bitstreams of the same access unit are re-assembled in increasing order of hierarchy_layer_index. For MVC video sub-bitstreams of AVC video streams conforming to one or more profiles defined in Annex H of ITU-T Rec. H.264|ISO/IEC 14496-10, this is the program element index, which is assigned in a way that any of these values are larger than the hierarchy_layer_index value specified in the hierarchy descriptor for the prefix MVC sub-bitstream.

Hierarchy embedded layer index field 172 may comprise a six-bit field that defines the hierarchy table index of the program element that needs to be accessed before decoding of the elementary stream associated with the corresponding instance of hierarchy descriptor 112. This disclosure leaves the value for hierarchy embedded layer index field 172 undefined for when hierarchy type field 162 has a value of 15 (that is, a value corresponding to the base layer).

Hierarchy channel field 176 may comprise a six-bit field that indicates the intended channel number for the associated program element in an ordered set of transmission channels. The most robust transmission channel is defined by the lowest value of hierarchy channel field 176, with respect to the overall transmission hierarchy definition. Note that a given hierarchy channel may at the same time be assigned to several program elements.

Reserved fields 164, 170, and 174 are reserved for future use by future standards development. The techniques of this disclosure do not, at this time, propose assigning semantic meaning to values of reserved fields 164, 170, and 174.

Timestamp reference (TREF) present flag field 168 is a one-bit filed that indicates whether a TREF field is present in the corresponding PES packet header. A TREF field in a PES packet is a 33-bit number coded in three separate fields. The TREF field indicates the decoding time value, in the system target decoder as indicated by the DTS, or in absence of the DTS, by the PTS of the PES header of the same j-th access unit in a corresponding elementary stream n Table 3 below describes the syntax elements of hierarchy descriptor 112 of this disclosure. Table 3 also provides, for each syntax element, a number of bits used to represent the syntax element and a mnemonic describing a type for the syntax element. The number of bits corresponds to the number of bits that are allocated to the corresponding syntax element when hierarchy descriptor 112 is transmitted in a coded bitstream. Mnemonics are used in the MPEG-2 Systems standard to describe different data types that are used in the coded bitstream. The mnemonics used in this disclosure include "uimsbf," which the MPEG-2 Systems standard defines as an unsigned integer having the most significant bit first, and "bslbf," which the MPEG-2 Systems standard defines as a bit string with left bit first, where "left" is the order in which bit strings are written in the MPEG-2 Systems standard. Each of the syntax elements in the example of Table 3 corresponds to a respective one of the syntax elements described above with respect to hierarchy descriptor 112.

TABLE 3

Hierarchy descriptor

| Syntax | No. Of bits | Mnemonic |
| --- | --- | --- |
| hierarchy_descriptor( ) { | | |
|     descriptor_tag | 8 | uimsbf |
|     descriptor_length | 8 | uimsbf |
|     view_enhancement_flag | 1 | bslbf |
|     temporal_scalability_flag | 1 | bslbf |
|     spatial_scalability_flag | 1 | bslbf |
|     quality_scalability_flag | 1 | bslbf |
|     hierarchy_type | 4 | uimsbf |
|     reserved | 2 | bslbf |
|     hierarchy_layer_index | 6 | uimsbf |
|     tref_present_flag | 1 | bslbf |
|     reserved | 1 | bslbf |
|     hierarchy_embedded_layer_index | 6 | uimsbf |
|     reserved | 2 | bslbf |
|     hierarchy_channel | 6 | uimsbf |
| } | | |

Table 4 below describes various potential values for hierarchy type field 162 of hierarchy descriptor 112, as well as the meaning for each value. This disclosure proposes adding a potential value of "14" for hierarchy type field 162, which comprises a description of "Prefix MVC sub-bitstream" as the description of the corresponding bitstream. The techniques of this disclosure define prefix MVC sub-bitstream to comprise all prefix NAL units with nal_unit_type (that is, a type value of the NAL unit) equal to 20 and associated non-VCL NAL units which, after re-assembled with the AVC video sub-bitstream of MVC, conforms to one or more profiles defined in Annex H of ITU-T Rec. H.264|ISO/IEC 14496-10. The techniques of this disclosure also propose that, when the AVC video sub-bitstream of MVC is present, prefix MVC sub-bitstream shall also be present.

TABLE 4

Hierarchy type field values

| Value | Description |
| --- | --- |
| 0 | Reserved |
| 1 | Spatial Scalability |
| 2 | SNR Scalability |
| 3 | Temporal Scalability |
| 4 | Data partitioning |
| 5 | Extension bit-stream |
| 6 | Private Stream |
| 7 | Multi-view Profile |
| 8 | Combined Scalability |
| 9 | MVC video sub-bitstream |
| 10-13 | Reserved |
| 14 | Prefix MVC sub-bitstream |
| 15 | Base layer or MVC base view sub-bitstream or AVC video sub-bitstream of MVC |

In some examples, hierarchy descriptor 112 may be used to signal an MVC sub-bitstream signaled by incremental sub-bitstream and embedded sub-bitstreams. The embedded sub-bitstreams include the direct dependent sub-bitstream corresponding to the hierarchy_embedded_layer_index and all the embedded sub-bitstreams of this direct dependent sub-bitstream. In this disclosure, the views that are explicitly contained are called enhance views, while the views that are embedded are called dependent views.

FIG. 6 is a conceptual diagram illustrating an example MVC prediction pattern. In the example of FIG. 6, eight views (having view IDs "S0" through "S7") are illustrated, and twelve temporal locations ("T0" through "T11") are illustrated for each view. That is, each row in FIG. 6 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Frames in FIG. 6 are indicated at the indication of each row and each column in FIG. 6 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multiview video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Table 5 below provides an example definition for an MVC extension sequence parameter set.

TABLE 5

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signalled_minus1 | 0 | ue(v) |
| for( i = 0; i <= num_level_values_signalled_minus1; i++ ) | | |
| { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | |

FIG. 6 provides various examples of inter-view prediction. Frames of view S1, in the example of FIG. 6, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 6, capital "B" and lowercase "b" are intended to indicate different hierarchical relationships between frames, rather than different encoding methodologies. In general, capital "B" frames are relatively higher in the prediction hierarchy than lowercase "b" frames. FIG. 6 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 6 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices is implied in the SPS MVC extension, as specified in Annex H of H.264/AVC (MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 6. Also, with respect to the example of FIG. 6, S0>S1, S2>S1, S2>S3, S4>S3, S4>S5, and S6>S5. Any decoding order for the views that does not violate these requirements is possible. Accordingly, many different decoding orders are possible, with only certain limitations. Two example decoding orders are presented below, although it should be understood that many other decoding orders are possible. In one example, illustrated in Table 6 below, views are decoded as soon as possible.

TABLE 6

| | View ID | | | | | | | |
|---|---|---|---|---|---|---|---|---|
| | S0 | S1 | S2 | S3 | S4 | S5 | S6 | S7 |
| View Order Index | 0 | 2 | 1 | 4 | 3 | 6 | 5 | 7 |

The example of Table 6 recognizes that view S1 may be decoded immediately after views S0 and S2 have been decoded view S3 may be decoded immediately after views S2 and S4 have been decoded, and view S5 may be decoded immediately after views S4 and S6 have been decoded.

Table 7 below provides another example decoding order in which the decoding order is such that any view that is used as a reference for another view is decoded before views that are not used as reference for any other view.

TABLE 7

| | View ID | | | | | | | |
|---|---|---|---|---|---|---|---|---|
| | S0 | S1 | S2 | S3 | S4 | S5 | S6 | S7 |
| View Order Index | 0 | 5 | 1 | 6 | 2 | 7 | 3 | 4 |

The example of Table 7 recognizes that frames of views S1, S3, S5, and S7 do not act as reference frames for frames of any other views, and therefore, views S1, S3, S5, and S7 are decoded after frames of those views that are used as reference frames, that is, views S0, S2, S4, and S6, in the example of FIG. 6. Relative to each other, views S1, S3, S5, and S7 may be decoded in any order. Accordingly, in the example of Table 7, view S7 is decoded before each of views S1, S3, and S5.

To be clear, there may be a hierarchical relationship between frames of each view as well as the temporal locations of the frames of each view. With respect to the example of FIG. 6, frames at temporal location T0 are either intra-predicted or inter-view predicted from frames of other views at temporal location T0. Similarly, frames at temporal location T8 are either intra-predicted or inter-view predicted from frames of other views at temporal location T8. Accordingly, with respect to a temporal hierarchy, temporal locations T0 and T8 are at the top of the temporal hierarchy.

Frames at temporal location T4, in the example of FIG. 6, are lower in the temporal hierarchy than frames of temporal locations T0 and T8 because frames of temporal location T4 are B-encoded with reference to frames of temporal locations T0 and T8. Frames at temporal locations T2 and T6 are lower in the temporal hierarchy than frames at temporal location T4. Finally, frames at temporal locations T1, T3, T5, and T7 are lower in the temporal hierarchy than frames of temporal locations T2 and T6.

In MVC, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. If originally the view_ids are ordered respect to the example of Table 6, the view order index values are {0, 1, 2} and {0, 1, 4} in these two examples, respectively. Note both of these sub-bitstreams can be decoded as independent MVC bitstreams and can be supported simultaneously.

Figure 7:
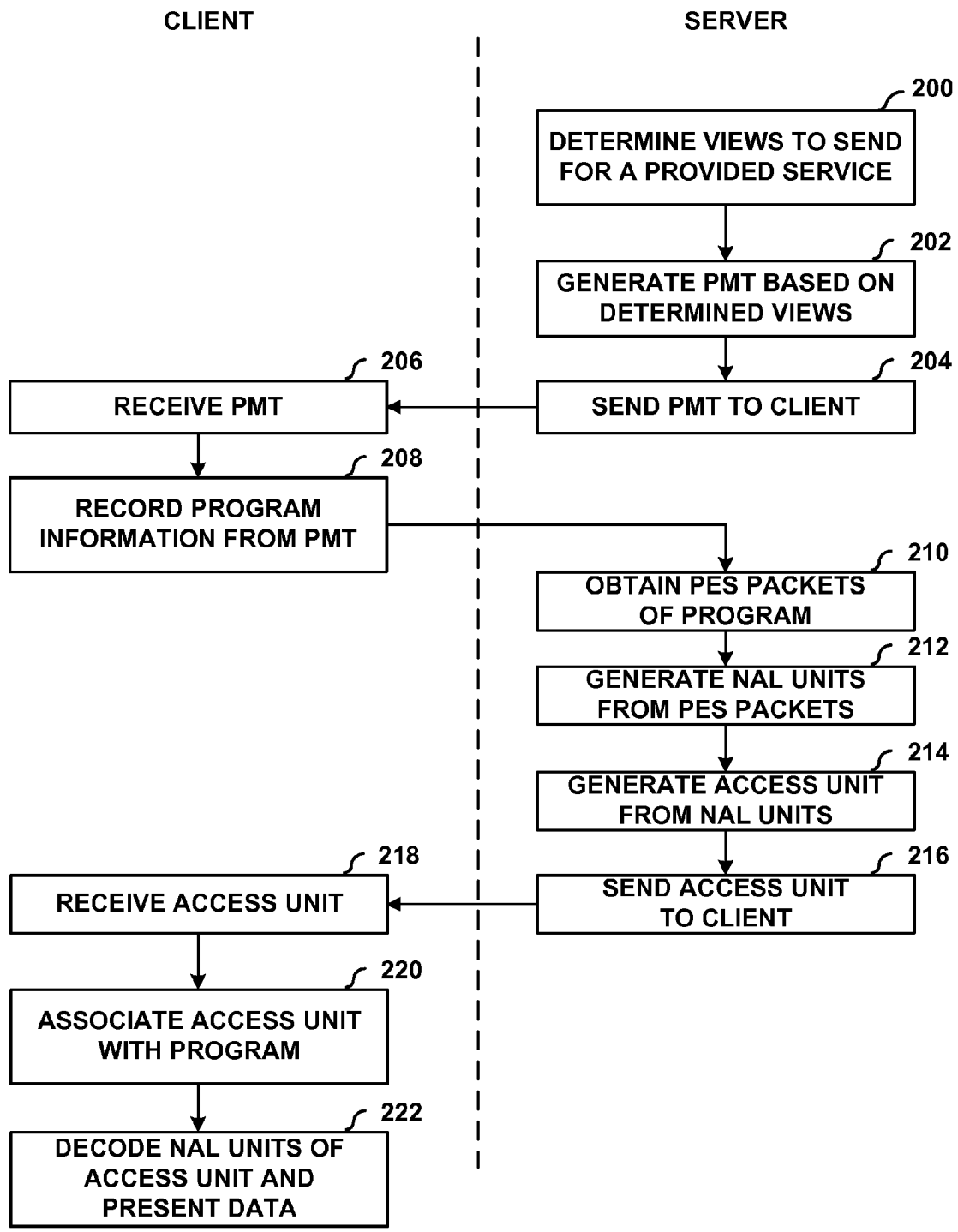
FIG. 7 if a flowchart illustrating an example method for sending an MPEG-2 Systems stream having a subset of views with nonconsecutive view order indexes from a server to a client.

FIG. 7 if a flowchart illustrating an example method for sending an MPEG-2 Systems stream having a subset of views with nonconsecutive view order indexes from a server to a client. The method of FIG. 7 is described, for purposes of example, with respect to A/V source device 20 and A/V destination device 40, although it should be understood that other examples may perform the method of FIG. 7. In the example of FIG. 7, actions attributed to the "server" may be performed by A/V source device 20, while actions performed by the "client" may be performed by A/V destination device 40.

In the example of FIG. 7, A/V source device 20 initially determines a subset of available views to send to A/V destination device 40 based on a service provided by A/V source device 20 (200). As discussed above, a service generally comprises a selection of views. With respect to the example of FIG. 6, a service may comprise views S0, S2, and S4. Assuming that the view order indexes of these views are the view order indexes prescribed by Table 6, as an example, the view order indexes for views S0, S2, and S4 may comprise view order indexes 0, 1, and 3. The remaining discussion of the method of FIG. 7 uses these view IDs and view order indexes as an example for purposes of explanation.

A/V source device 20 may then prepare a Program Map Table (PMT) based on the views that were determined to be sent as part of provision of the service (202). In particular, PMT constructor 64 of multiplexer 30 may prepare a PMT based on information retrieved from program specific information tables 88 for one or more programs corresponding to the service provided by A/V source device 20. In accordance with the techniques of this disclosure, preparation of the PMT includes generation of MVC extension descriptor 110 and hierarchy descriptor 112.

To generate MVC extension descriptor 110, PMT constructor 64 of multiplexer 30 sets descriptor tag field 120 equal to "49." PMT constructor 64 sets the values of average bit rate field 124, maximum bit rate field 126, temporal ID start field 130, temporal ID end field 132, and no SEI NAL unit present field 134 according to the program specific data of the program as stored by program specific information tables 88. PMT constructor 64 also sets the value of view order index fields 136 according to the view order indexes of the selected views. In the example described above, PMT constructor 64 includes three view order index field values representative of view order indexes 0, 1, and 3. In this manner, this example provides an MVC extension descriptor that individually indicates each view order index of the views of the program. Moreover, because view order index "2" is skipped, this example is an example in which the view order indexes are nonconsecutive.

To generate hierarchy descriptor 112, PMT constructor 64 sets the values of the fields of hierarchy descriptor 112 according to program specific information tables 88. In accordance with the techniques of this disclosure, PMT constructor 64 may also set the value of view enhancement flag field 154 to a value of '0' to indicate that the associated program element enhances the number of views of the bit-stream resulting from the program element referenced by the value of hierarchy embedded layer index field 172.

After generating the PMT, A/V source device 20 may transmit the PMT to A/V destination device 40, e.g., in the form of an NAL unit (204). In some examples, A/V source device 20 may periodically resend the PMT to A/V destination device 40, e.g., after a predetermined time interval or after a particular amount of data has been sent. A/V destination device 40 may record program information from the PMT in a client-side storage medium (208), which may essentially mirror program specific information tables 88 of multiplexer 30. For example, demultiplexer 38 may comprise a set of program specific information tables similar to program specific information tables 88 of multiplexer 30. Upon receiving program specific information, such as the transmitted PMT, demultiplexer 38 may update the program specific information tables of demultiplexer 38.

Multiplexer 30 may then receive PES packets of one or more programs associated with the service provided by A/V source device 20 (210). Multiplexer 30 may determine that the PES packets are to be included in the transport stream to A/V destination device 40 by performing a lookup on the stream IDs of the PES packets. When the stream ID of a PES packet matches a view to be included in the transport stream, multiplexer 30 may form an NAL unit from the PES packet, e.g., by encapsulating the PES packet with a program ID (PID) corresponding to the program (212). Multiplexer 30 may also form an access unit from a plurality of such NAL units (214) and send the access unit to A/V destination device 40 (216).

A/V destination device 40 may then receive the access unit from A/V source device 20 (218) and associate the access unit with the program (220), e.g., by referring to the PID of the access unit. Demultiplexer 38 of A/V destination device 40 may demultiplex the access unit into constituent NAL units, and accordingly, PES packets, which demultiplexer 38 may ultimately pass to audio decoder 46 and/or video decoder 48. Video decoder 48 may decode each of the views and send the decoded views to video output 44, which may comprise a stereoscopic or autostereoscopic video display or other display device requiring a plurality of views. Likewise, audio decider 46 may decode audio frames to form decoded audio data and send the audio data to audio output 42, e.g., a speaker. In this manner, A/V destination device 40 may decode and display the received data (222).

Figure 8:
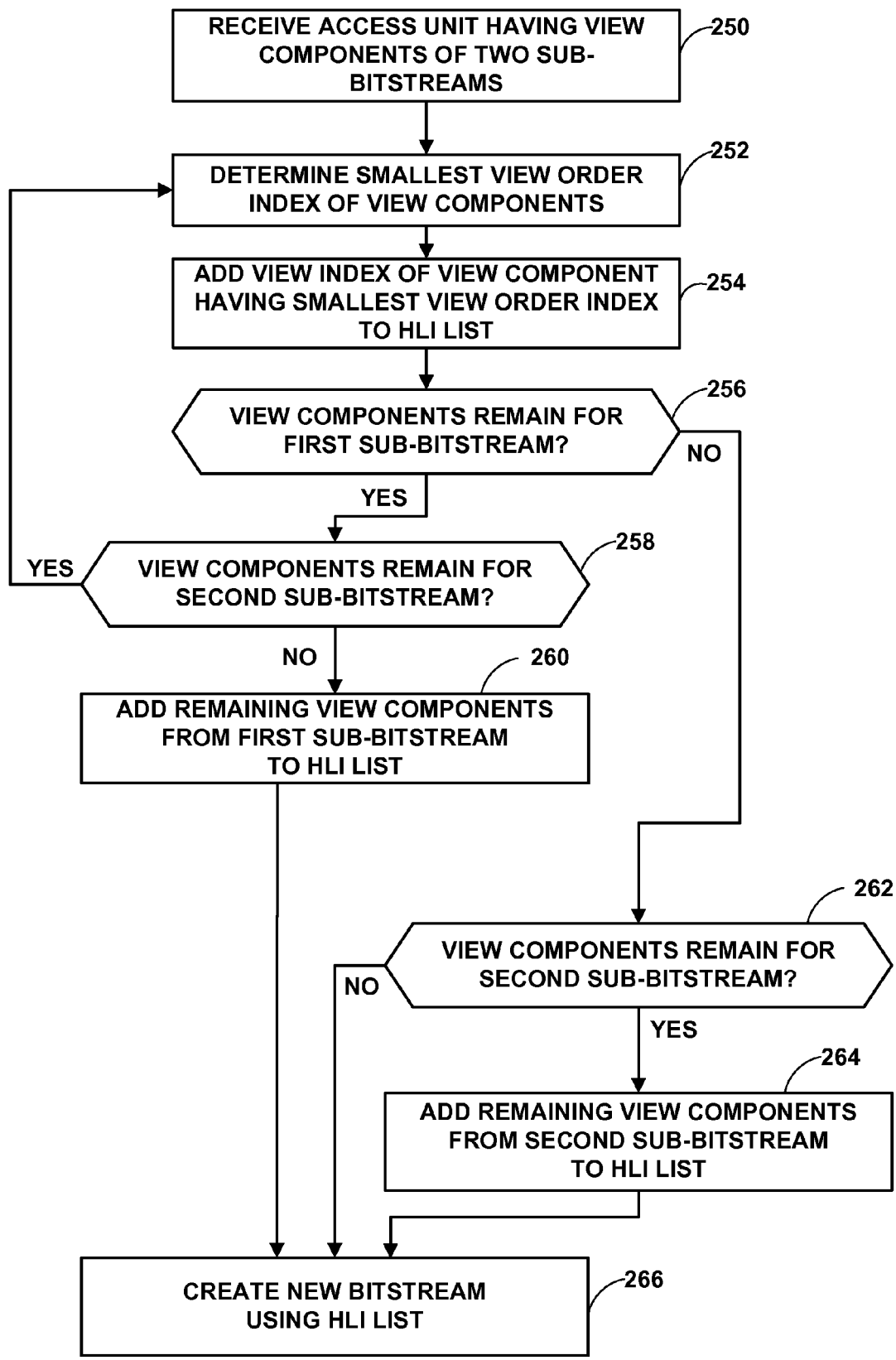
FIG. 8 is a flowchart illustrating an example method for assembling view components of two or more sub-bitstreams to produce a bitstream such that the view components have increasing view order indexes.

FIG. 8 is a flowchart illustrating an example method for assembling view components of two or more sub-bitstreams to produce a bitstream such that the view components have increasing view order indexes. The method may order the sub-bitstreams without referring to view IDs of the respective sub-bitstreams and view components. Suppose, with respect to the example of FIG. 6, a first sub-bitstream of a transport stream (or program stream) includes view components of views S0, S2, and S4, while a second sub-bitstream of the transport stream (corresponding to an embedded sub-bitstream of the first sub-bitstream) includes view components of views S1 and S3. This disclosure may also refer to embedded sub-bitstreams as "dependent sub-bitstreams." Likewise, this disclosure may refer to sub-bitstreams in which dependent sub-bitstreams are embedded as primary sub-bitstreams. Accordingly, the first sub-bitstream of FIG. 8 may be referred to as a primary sub-bitstream, while the second sub-bitstream may be referred to as an embedded or dependent sub-bitstream.

Assuming that the view order indexes for this example are as defined with respect to the example of Table 6, the view order indexes of the view components in the first sub-bitstream are 0, 1, and 3 (respectively), while the view order indexes for the second sub-bitstream are 2 and 4. Accordingly, if the view components of the first bitstream in this example were entirely decoded before the view components of the second sub-bitstream, the decoding order, in terms of view order indexes, would correspond to 0, 1, 3, 2, 4. Because the view order indexes are to describe the decoding order, such a decoding order would constitute a violation of the MVC specification. Accordingly, the method of FIG. 8 may be used to reorder the view components, in terms of view order indexes, such that the decoding order of the view components conforms to the MVC specification.

The method of FIG. 8 generally corresponds to an example method that includes, when assembling sub-bitstreams, the view components in each access unit should follow the increasing order of view order indices as conveyed in all the current sub-bitstream and its embedded sub-bitstreams. The techniques of this disclosure may make possible assembly of a conforming MVC sub-bitstream without checking the view_id syntax element in the NAL unit header of the NAL units and mapping it to view order index. The method of FIG. 8 may be used to produce a list, referred to as the "hierarchy layer index list" (HLI) that comprises indexes corresponding to view_IDs of the sub-bitstreams in an order complaint to the MVC standard.

Initially, a client device, such as A/V destination device 40, receives an access unit having view components of two sub-bitstreams (250). It is assumed, for the purposes of example, that the second sub-bitstream comprises an embedded or dependent sub-bitstream of the first sub-bitstream. The example method of FIG. 8 is described with respect to two sub-bitstreams. However, the techniques of FIG. 8 are also applicable to examples having more than two sub-bitstreams. Moreover, the method of FIG. 8 is described for purposes of example and explanation with respect to demultiplexer 38 of A/V destination device 40. However, it should be understood that the method of FIG. 8 may be performed by any device, module, unit, or combination of firmware, hardware, and/or software components, for reorganizing views of two or more sub-bitstreams to conform to the MVC standard.

It is assumed that view components of each sub-bitstream are ordered according to the MVC standard. Therefore, demultiplexer 38 determines which of the view components of the sub-bitstreams has the smallest view order index (252). Demultiplexer 38 may then add an index of the view component (which may comprise one or more NAL units) to the HLI list at the next available position (254). In some examples, a view component may comprise one or more NAL units comprising multimedia data, as well as a delimiter NAL unit that may be used to distinguish the view component from another, subsequent view component. Demultiplexer 38 may then determine whether any view components remain for the first sub-bitstream (256).

When view components remain for the first sub-bitstream ("YES" branch of 256), demultiplexer 38 may determine whether view components also remain for the second sub-bitstream (258). When both the first sub-bitstream and the second sub-bitstream include at least one view component ("YES" branch of 258), demultiplexer 38 returns to step 252, to determine the smallest view order index of the view components and add the view index of the smallest view component to the HLI list. However, when view components only remain for the first sub-bitstream and not the second ("NO" branch of 258), demultiplexer 38 may add the remaining view components of the first sub-bitstream to the HLI list (260).

On the other hand, when no view components remain for the first sub-bitstream ("NO" branch of 256), demultiplexer 38 may determine whether view components remain for the second sub-bitstream (262). When the second sub-bitstream has remaining view components, demultiplexer 38 may add the remaining view components of the second sub-bitstream to the HLI list (264).

After the HLI list comprises view IDs in order of the corresponding view order indexes (e.g., after completion of step 260, 264, or "NO" branch of 262), demultiplexer 38 may form a new bitstream, comprising the sub-bitstreams in the order determined according to the HLI list (266). That is, for an access unit of the new bitstream, where the access unit comprises a plurality of view components, the view components are ordered in the new bitstream such that a view order index of each of the view component is greater than all preceding view order indexes and less than all subsequent view order indexes. This bitstream may then be forwarded to, e.g., video decoder 48, for decoding of the view components, and ultimately display of the view components.

The example algorithms below provide an example process for ordering sub-bitstreams to comply with the MVC standard. In the examples, there is a list of hierarchy_layer_index (HLIList) values that either corresponds to the current MVC sub-bitstream or the embedded sub-bitstreams. As noted above, a view component may comprise a plurality of NAL units. Likewise, in some examples, a view component may comprise, or be followed by, a delimiter NAL unit to differentiate each view component from another view component.

The process for assembling a new bitstream may be defined as follows:
1) Set the dependent sub-bitstream as the sub-bitstream which does not have an embedded sub-bitstream.
2) In the ascending order of hierarchy layer index. The following apply iteratively:
   1. Assemble a sub-bitstream which is conforming to MVC and described in the hierarchy descriptor with hierarchy_layer_index equal to HLI:
   2. This process has the following as input:
      i. the enhancement sub-bitstream that explicitly present;
      ii. the dependent sub-bitstream. Note that it is conforming to MVC and thus has the view components placed in the increasing order of view order index in each access unit;
      iii. a list of the view order indices in the enhancement sub-bitstream;
      iv. a list of the view order indices in the dependent sub-bitstream;
   3. The process has the following as output
      i. a new sub-bitstream which has all the view components assembled and thus is conforming to MVC and form a complete operation point corresponding to the HLI defined in the hierarchy descriptor;
      ii. A list of view order indices in the new sub-bitstream;
   4. Set the new sub-bitstream generated in step 3 as the dependent sub-bitstream;
   5. If HLI is the last one in the list of the HLIList, set the dependent sub-bitstream as the final assembled MVC sub-bitstream and terminate the whole assembling process.

The following algorithm describes an example process to assemble a sub-bitstream based on a dependent sub-bitstream and an enhancement sub-bitstream, as required in step 2 of the above example algorithm:
1. The input of the assembling process are two lists and two sub bitstreams, each of which are already ordered in the ascending order of view order index. Each of the two list contains the view order indices in the ascending order, the two lists are VOIdxListE and VOIdxListD. The two sub-bitstreams are dependent sub-bitstream and enhance sub-bitstream. A new list is VOIdxListNew, which is empty at the beginning
2. For each access unit, apply the following:
   i. Set the VOIdxE as the first value of the VOIdxListE and VOIdxD as the first value of the VOIdxListD;
   ii. If VOIdxE is smaller than VOIdxD, assemble one view component from the enhance sub-bitstream, set VOIdxE to the next value in the VOIdxListE, VOIdxCurr is set to VOIdxE; otherwise, assemble one view component from the dependent sub-bitstream, set VOIdxD to the next value in the VOIdxListD, VOIdxCurr is set to VOIdxD. Add VOIdxCurr to VOIdxListNew.

When assembling one view component from a sub-bitstream, the NAL units are added until a delimiter NAL unit is encountered.
   iii. If VOIdxE is not at the end of VOIdxListE and VOIdxD is not at the end of VOIdxListD, terminate the whole process; otherwise, go to step iv.
   iv. Else If VOIdxE is at the end of the VOIdxListE, assemble all the remaining view components in the dependent sub-bitstream, add all the remaining values in VOIdxListD into VOIdxListNew, and set the VOIdxD to the end of the VOIdxListD.

v. Else if VOIdxD is at the end of the VOIdxListD, assemble all the remaining view components in the enhance sub-bitstream, add all the remaining values in VOIdxListE into VOIdxListNew and set the VOIdxE to the end of the VOIdxListE.

vi. Else, go to step ii.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of generating multiview video data, comprising:

constructing, with a source device, a multiview video coding (MVC) extension descriptor comprising individual view order index values for each view included in a corresponding MPEG-2 (Motion Picture Experts Group) System standard bitstream, wherein the bitstream comprises a first view of a scene associated with a first view order index and a second view of the scene associated with a second view order index, wherein the first view order index and the second view order index are non-consecutive, wherein the individual view order index values comprise a first view order index value for the first view order index and a second view order index value for the second view order index, wherein the second view order index value occurs immediately after the first view order index value in the MVC extension descriptor, and wherein a difference between the second view order index value and the first view order index value is greater than one; and outputting the MVC extension descriptor.

2. The method of claim 1, wherein the MVC extension descriptor comprises a program map table and the bitstream comprises an MPEG-2 transport stream.

3. The method of claim 1, wherein the MVC extension descriptor comprises a program stream map and the bitstream comprises an MPEG-2 program stream.

4. The method of claim 1, wherein constructing the MVC extension descriptor comprises constructing the MVC extension descriptor such that the view order index values are arranged in increasing order.

5. The method of claim 1, wherein constructing the MVC extension descriptor further comprises constructing a hierarchy descriptor comprising a value for a view enhancement flag field that indicates that an associated program element enhances a number of views of the bitstream resulting from the program element referenced by a value of a hierarchy embedded layer index field of the hierarchy descriptor.

6. The method of claim 5, wherein constructing the hierarchy descriptor comprises setting the value of the view enhancement flag field to a value of zero.

7. The method of claim 5, further comprising determining that the bitstream includes an advanced video coding (AVC) base view of MVC, wherein constructing the hierarchy descriptor comprises setting a value of a hierarchy type field in the hierarchy descriptor to a value indicative that the bitstream includes a prefix MVC sub-bitstream comprising all prefix network abstraction layer (NAL) units comprising a type value equal to twenty.

8. The method of claim 7, wherein setting the value of the hierarchy type field comprises setting the value of the hierarchy type field to a value of fourteen.

9. The method of claim 1, further comprising:

constructing an access unit comprising a view component of the first view and a view component of the second view, wherein the view component of the first view occurs in the access unit immediately before the view component of the second view such that the first view order index and the second view order index for the view components occur nonconsecutively in the access unit; and outputting the access unit.

10. An apparatus for generating multiview video data, comprising:

a video encoder that encodes a plurality of views of a scene;
a multiplexer that constructs a multiview video coding (MVC) extension descriptor comprising individual view order index values for each view included in a corresponding MPEG-2 (Motion Picture Experts Group) System standard bitstream, wherein the bitstream comprises a first view of the plurality of views of the scene associated with a first view order index and a second view of the plurality of views of the scene associated with a second view order index, wherein the first view order index and the second view order index are non-consecutive, wherein the individual view order index values comprise a first view order index value for the first view order index and a second view order index value for the second view order index, wherein the second view order index value occurs immediately after the first view order index value in the MVC extension descriptor, and wherein a difference between the second view order index value and the first view order index value is greater than one; and
an output interface that outputs the MVC extension descriptor.

11. The apparatus of claim 10, wherein the MVC extension descriptor comprises a program map table and the bitstream comprises an MPEG-2 transport stream.

12. The apparatus of claim 10, wherein the MVC extension descriptor comprises a program stream map and the bitstream comprises an MPEG-2 program stream.

13. The apparatus of claim 10, wherein the multiplexer constructs the MVC extension descriptor such that the view order index values are arranged in increasing order.

14. The apparatus of claim 10, wherein to construct the MVC extension descriptor, the multiplexer further constructs a hierarchy descriptor comprising a value for a view enhancement flag field that indicates that an associated program element enhances a number of views of the bitstream resulting from the program element referenced by a value of a hierarchy embedded layer index field of the hierarchy descriptor.

15. The apparatus of claim 14, wherein to construct the hierarchy descriptor, the multiplexer sets the value of the view enhancement flag field to a value of zero.

16. The apparatus of claim 14, wherein the multiplexer determines whether the bitstream includes an advanced video coding (AVC) base view of MVC, and when the bitstream includes the AVC base view of MVC, the multiplexer sets a value of a hierarchy type field in the hierarchy descriptor to a value indicative that the bitstream includes a prefix MVC sub-bitstream comprising all prefix network abstraction layer (NAL) units comprising a type value equal to twenty.

17. The apparatus of claim 16, wherein to set the value of the hierarchy type field, the multiplexer sets the value of the hierarchy type field to a value of fourteen.

18. The apparatus of claim 10,
wherein the multiplexer constructs an access unit comprising a view component of the first view and a view component of the second view, wherein the view component of the first view occurs in the access unit immediately before the view component of the second view such that the first view order index and the second view order index for the view components occur nonconsecutively in the access unit, and
wherein the output interface outputs the access unit.

19. The apparatus of claim 10, wherein the apparatus comprises at least one of:
an integrated circuit;
a microprocessor, and
a wireless communication device that includes the video encoder.

20. An apparatus for generating multiview video data, comprising:
means for constructing, with a source device, multiview video coding (MVC) extension descriptor comprising individual view order index values for each view included in a corresponding MPEG-2 (Motion Picture Experts Group) System standard bitstream, wherein the bitstream comprises a first view of a scene associated with a first view order index and a second view of the scene associated with a second view order index, wherein the first view order index and the second view order index are non-consecutive, wherein the individual view order index values comprise a first view order index value for the first view order index and a second view order index value for the second view order index, wherein the second view order index value occurs immediately after the first view order index value in the MVC extension descriptor, and wherein a difference between the second view order index value and the first view order index value is greater than one; and
means for outputting the MVC extension descriptor.

21. The apparatus of claim 20, wherein the MVC extension descriptor comprises a program map table and the bitstream comprises an MPEG-2 transport stream.

22. The apparatus of claim 20, wherein the MVC extension descriptor comprises a program stream map and the bitstream comprises an MPEG-2 program stream.

23. The apparatus of claim 20, wherein the means for constructing the MVC extension descriptor comprises means for constructing the MVC extension descriptor such that the view order index values are arranged in increasing order.

24. The apparatus of claim 20, wherein the means for constructing the MVC extension descriptor further comprises means for constructing a hierarchy descriptor comprising a value for a view enhancement flag field that indicates that an associated program element enhances a number of views of the bitstream resulting from the program element referenced by a value of a hierarchy embedded layer index field of the hierarchy descriptor.

25. The apparatus of claim 24, wherein the means for constructing the hierarchy descriptor comprises means for setting the value of the view enhancement flag field to a value of zero.

26. The apparatus of claim 24, further comprising means for determining that the bitstream includes an advanced video coding (AVC) base view of MVC, wherein the means for constructing the hierarchy descriptor comprises means for setting a value of a hierarchy type field in the hierarchy descriptor to a value indicative that the bitstream includes a prefix MVC sub-bitstream comprising all prefix network abstraction layer (NAL) units comprising a type value equal to twenty.

27. The apparatus of claim 26, wherein the means for setting the value of the hierarchy type field comprises means for setting the value of the hierarchy type field to a value of fourteen.

28. The apparatus of claim 20, further comprising:
constructing an access unit comprising a view component of the first view and a view component of the second view, wherein the view component of the first view occurs in the access unit immediately before the view component of the second view such that the first view order index and the second view order index for the view components occur nonconsecutively in the access unit; and
outputting the access unit.

29. A non-transitory computer-readable storage medium encoded with instructions for causing a processor of a video data source device to:

construct a multiview video coding (MVC) extension descriptor comprising individual view order index values for each view included in a corresponding MPEG-2 (Motion Picture Experts Group) System standard bitstream, wherein the bitstream comprises a first view of a scene associated with a first view order index and a second view of the scene associated with a second view order index, wherein the first view order index and the second view order index are non-consecutive, wherein the individual view order index values comprise a first view order index value for the first view order index and a second view order index value for the second view order index, wherein the second view order index value occurs immediately after the first view order index value in the MVC extension descriptor, and wherein a difference between the second view order index value and the first view order index value is greater than one; and output the MVC extension descriptor.

30. The non-transitory computer-readable storage medium of claim 29, wherein the MVC extension descriptor comprises a program map table and the bitstream comprises an MPEG-2 transport stream.

31. The non-transitory computer-readable storage medium of claim 29, wherein the MVC extension descriptor comprises a program stream map and the bitstream comprises an MPEG-2 program stream.

32. The non-transitory computer-readable storage medium of claim 29, wherein the instructions to construct the MVC extension descriptor comprise instructions to construct the MVC extension descriptor such that the view order index values are arranged in increasing order.

33. The non-transitory computer-readable storage medium of claim 29, wherein the instructions to construct the MVC extension descriptor further comprise instructions to construct a hierarchy descriptor comprising a value for a view enhancement flag field that indicates that an associated program element enhances a number of views of the bitstream resulting from the program element referenced by a value of a hierarchy embedded layer index field of the hierarchy descriptor.

34. The non-transitory computer-readable storage medium of claim 33, wherein the instructions to construct the hierarchy descriptor comprise instructions to set the value of the view enhancement flag field to a value of zero.

35. The non-transitory computer-readable storage medium of claim 33, further comprising instructions to determine that the bitstream includes an advanced video coding (AVC) base view of MVC, wherein constructing the hierarchy descriptor comprises setting a value of a hierarchy type field in the hierarchy descriptor to a value indicative that the bitstream includes a prefix MVC sub-bitstream comprising all prefix network abstraction layer (NAL) units comprising a type value equal to twenty.

36. The non-transitory computer-readable storage medium of claim 35, wherein the instructions to set the value of the hierarchy type field comprise instructions to set the value of the hierarchy type field to a value of fourteen.

37. The non-transitory computer-readable storage medium of claim 29, further comprising instructions to:

construct an access unit comprising a view component of the first view and a view component of the second view, wherein the view component of the first view occurs in the access unit immediately before the view component of the second view such that the first view order index and the second view order index for the view components occur nonconsecutively in the access unit; and output the access unit.

* * * * *